(12) United States Patent
Cohn et al.

(10) Patent No.: US 10,039,147 B2
(45) Date of Patent: Jul. 31, 2018

(54) APPARATUS, SYSTEM AND METHOD OF TRIGGERING A WIRELESS DOCKING SESSION BETWEEN A MOBILE DEVICE AND A WIRELESS DOCKING DEVICE

(71) Applicant: INTEL IP CORPORATION, Santa Clara, CA (US)

(72) Inventors: Daniel Cohn, Raanana (IL); Elad Levy, Rishon LeZion (IL); Solomon B. Trainin, Haifa (IL); Gadi Shor, Tel Aviv (IL); Michael Glik, Kfar Saba (IL); Tal Davidson, Holon (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/281,119

(22) Filed: Sep. 30, 2016

(65) Prior Publication Data

US 2018/0098366 A1 Apr. 5, 2018

(51) Int. Cl.
*H04B 5/00* (2006.01)
*H04W 76/14* (2018.01)
(Continued)

(52) U.S. Cl.
CPC .......... *H04W 76/14* (2018.02); *H04B 5/0031* (2013.01); *H04B 5/0037* (2013.01);
(Continued)

(58) Field of Classification Search
CPC .. H02J 50/00; H02J 50/05; H02J 50/10; H02J 50/12; H02J 50/20; H02J 50/40;
(Continued)

(56) References Cited

U.S. PATENT DOCUMENTS 7,825,625 B2 * 11/2010 Posamentier ......... H02J 7/0004
320/108
8,254,992 B1 * 8/2012 Ashenbrenner ....... G06F 1/1632
455/41.2
(Continued)

FOREIGN PATENT DOCUMENTS

WO 2013105005 7/2013

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Edward Urban
*Assistant Examiner* — Rui Hu
(74) *Attorney, Agent, or Firm* — Shichrur & Co.

(57) ABSTRACT

Some demonstrative embodiments include apparatuses, devices, systems and methods of triggering a wireless docking session between a mobile device and a wireless docking device. For example, an apparatus may include circuitry and logic configured to cause a mobile device to detect a wireless charging of the mobile device by a wireless docking device; and to, upon detection of the wireless charging, trigger a wireless docking session between the mobile device and the wireless docking device.

14 Claims, 8 Drawing Sheets

(51) Int. Cl.
*H04W 76/02* (2009.01)
*H04W 8/00* (2009.01)
*H04W 40/00* (2009.01)
*H04W 84/12* (2009.01)

(52) U.S. Cl.
CPC ......... *H04W 8/005* (2013.01); *H04W 40/005* (2013.01); *H04W 76/023* (2013.01); *H04W 84/12* (2013.01)

(58) Field of Classification Search
CPC .. H02J 50/80; H02J 50/90; H02J 7/025; H02J 7/027; H04B 5/0037; H04B 5/0031
USPC ................ 455/41.1–41.3, 573, 410, 411
See application file for complete search history.

(56) References Cited

U.S. PATENT DOCUMENTS

| | | | | |
|---|---|---|---|---|
| 8,255,720 | B1* | 8/2012 | Conway | G01C 21/265 |
| | | | | 713/320 |
| 8,805,456 | B1* | 8/2014 | Hardy | H02J 7/025 |
| | | | | 455/573 |
| 8,825,118 | B2* | 9/2014 | Kim | H02J 7/0047 |
| | | | | 455/573 |
| 8,947,042 | B2* | 2/2015 | Kirby | H02J 5/005 |
| | | | | 320/108 |
| 9,020,436 | B2* | 4/2015 | Castillo | G08C 17/02 |
| | | | | 340/5.1 |
| 9,496,925 | B2* | 11/2016 | Troberg | H04B 5/0037 |
| 9,627,913 | B2* | 4/2017 | Maugars | H02J 7/025 |
| 9,755,437 | B2* | 9/2017 | Kuusilinna | H02J 7/0004 |
| 2002/0119800 | A1 | 8/2002 | Jaggers et al. | |
| 2004/0092249 | A1* | 5/2004 | Sugikawa | H04L 61/301 |
| | | | | 455/411 |
| 2011/0131358 | A1 | 6/2011 | Ganesh et al. | |
| 2011/0136550 | A1* | 6/2011 | Maugars | H02J 7/025 |
| | | | | 455/573 |
| 2013/0084800 | A1* | 4/2013 | Troberg | H04B 5/0037 |
| | | | | 455/41.1 |
| 2013/0175986 | A1* | 7/2013 | Senatori | G06F 1/1616 |
| | | | | 320/108 |
| 2013/0210347 | A1* | 8/2013 | Ling | H04W 4/80 |
| | | | | 455/41.1 |
| 2013/0219098 | A1* | 8/2013 | Turnpenny | H04M 1/04 |
| | | | | 710/303 |
| 2013/0288600 | A1* | 10/2013 | Kuusilinna | H02J 7/0004 |
| | | | | 455/41.2 |
| 2013/0324035 | A1* | 12/2013 | Strommen | G06F 3/01 |
| | | | | 455/41.1 |
| 2014/0059263 | A1 | 2/2014 | Rosenberg et al. | |
| 2014/0152235 | A1* | 6/2014 | Huang | G06F 1/1632 |
| | | | | 320/107 |
| 2014/0349578 | A1* | 11/2014 | Huang | H04L 67/16 |
| | | | | 455/41.2 |
| 2015/0006395 | A1* | 1/2015 | Chu | G06Q 20/40 |
| | | | | 705/44 |
| 2015/0318898 | A1* | 11/2015 | Jurgovan | H04B 5/0031 |
| | | | | 455/41.1 |
| 2016/0150354 | A1* | 5/2016 | Ekberg | H04B 5/0031 |
| | | | | 455/41.1 |
| 2016/0285299 | A1* | 9/2016 | Amand | H02J 7/025 |

OTHER PUBLICATIONS

Rezence, Alliance for Wireless Power, "A4WP-S-0001 v1.3, A4WP Wireless Power Transfer System Baseline System Specification (BSS) Version 1.3", Nov. 5, 2014, 108 pages.

"System Description Wireless Power Transfer", vol. I: Low Power, Part 1: Interface Definition, Version 1.1.2 Jun. 2013, 186 pages.

Power Matters Alliance, PMA-TS-0005-00-0 v1.00, "PMA Wireless Power Transfer Network (WPTN) Specification—Overview and Stage 1 Information, Wireless Power Consortium", Jan. 19, 2015, 20 pages.

Power Matters Alliance, PMA-TS-0003-0 v3.00, "PMA Inductive Wireless Power and Charging Transmitter Specification—System Release 1", Jul. 1, 2015, 116 pages.

Power Matters Alliance, PMA-TS-0003-0 v2.00, "PMA Inductive Wireless Power and Charging Transmitter Specification—System Release 1", Apr. 24, 2014, 66 pages.

Power Matters Alliance, PMA-TS-0001-0 v2.00, "PMA Inductive Wireless Power and Charging Receiver Specification—System Release 1", Apr. 24, 2014, 58 pages.

International Search Report and Written Opinion for PCT/US2017/049238, dated Dec. 11, 2017, 14 pages.

* cited by examiner

APPARATUS, SYSTEM AND METHOD OF TRIGGERING A WIRELESS DOCKING SESSION BETWEEN A MOBILE DEVICE AND A WIRELESS DOCKING DEVICE

TECHNICAL FIELD

Embodiments described herein generally relate to triggering a wireless docking session between a mobile device and a wireless docking device.

BACKGROUND

Mobile devices are becoming smaller and smaller, and typically have decreasingly smaller screens and less Input/Output (TO) ports from generation to generation.

Docking stations are commonly used nowadays to extend the IO port array of the mobile devices, and provide a convenient means for a mobile device to hook up to a static variety of peripheral devices ("peripherals"), such as displays, monitors, external storage devices, external Hard Disk Drives (HDD), a mouse, keyboards, webcams, communication devices, and the like.

A docking device (also referred to as "docking station") may typically be placed on a table, while being permanently connected to the peripherals, and a user of the mobile device may connect the mobile device to the docking station ("dock") to utilize the peripherals.

A wireless docking device is a docking device, in which the user may connect the mobile device to the wireless docking device in a wireless manner.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
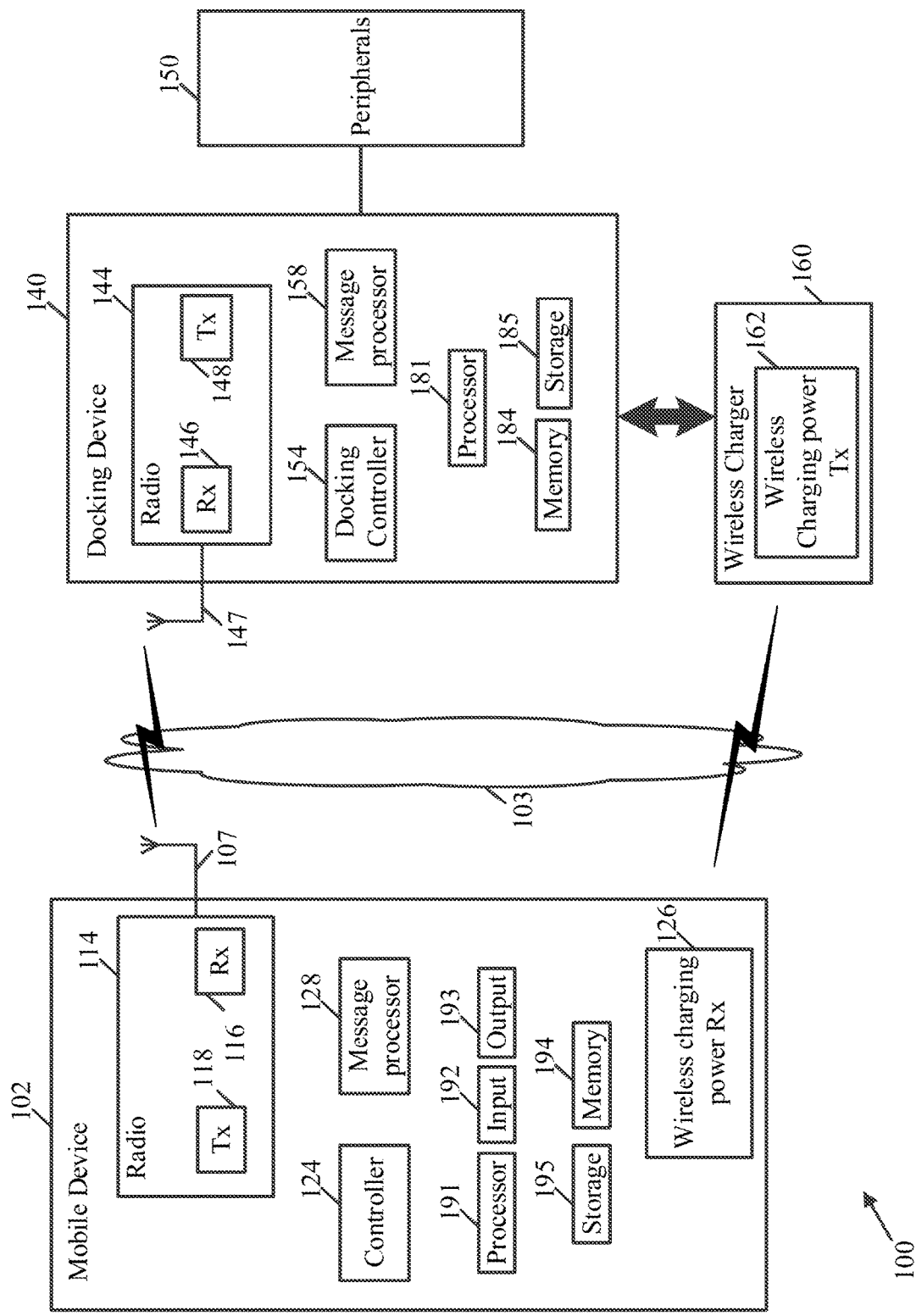
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or systems operating in accordance with existing Alliance for Wireless Power (A4WP) Specifications (including A4WP Wireless Power Transfer System Baseline System Specification (BSS) Proposal Version 1.3, Nov. 5, 2014) and/or future versions and/or derivatives thereof, devices and/or systems operating in accordance with existing Wireless Power Consortium (WPC) Specifications (including "System Description, Wireless Power Transfer, Volume I: Low Power, Part 1: Interface Definition, Version 1.1.2, June 2013") and/or future versions and/or derivatives thereof, devices and/or systems operating in accordance with existing Power Matters Alliance (PMA) Specifications (including "PMA-TS-0005-00-0 v1.00, Jan. 19, 2015, PMA Wireless Power Transfer Network (WPTN) Specification—Overview and Stage 1 Information"; "PMA-TS-0003-0 v3.00, 1 Jul. 2015, PMA Inductive Wireless Power and Charging Transmitter Specification—System Release 1"; and/or "PMA-TS-0001-0 v2.00, 24 Apr. 2014, PMA Inductive Wireless Power and Charging Receiver Specification—System Release 1") and/or future versions and/or derivatives thereof, devices and/or networks operating in accordance with wireless charging Specifications, devices and/or networks operating in accordance with resonant wireless charging Specifications, devices and/or networks operating in accordance with inductive wireless charging Specifications, wireless transfer Specifications, devices and/or networks operating in accordance with existing IEEE 802.11 standards (including IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 December, 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); and/or IEEE 802.11az (IEEE 802.11az, Next Generation Positioning)) and/or future versions and/or derivatives thereof, devices and/or networks operating in accordance with existing WiFi Alliance (WFA) Specifications (including Wi-Fi Neighbor Awareness Networking (NAN) Technical Specification, Version 1.0, May 1, 2015) and/or future versions and/or derivatives thereof, devices and/or networks operating in accordance with existing WFA Peer-to-Peer (P2P) specifications (including WiFi P2P technical specification, version 1.5, Aug. 4, 2014) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, a sub 1 GHz (S1G) frequency band, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

A "wireless power signal" and/or "wireless charging signal" may include, for example, a transmission of electric power from a first device (also referred to as "power transmitter", "Wireless Power Transmitter (WPT)" or "Power Transmitter Unit (PTU)") to at least one second device (also referred to as "power receiver", "Wireless Power Receiver (WPR)" or "Power Receiver Unit (PRU)"), via a wireless medium, e.g., without using an electric cable or wire to transfer the electric power between the power transmitter and power receiver. In one example, the wireless power signal may be in the form of a magnetic field, which may configured to induce electric current at the power receiver. Alternatively, the wireless power signal may include any other form of transferring power from the power transmitter to the power receiver.

Some demonstrative embodiments may be implemented by resonant wireless charging devices and/or systems, e.g., as described below. Other embodiments may be implemented for any other type of wireless charging, e.g., inductive wireless charging, or any other type of wireless power transfer.

Reference is made to FIG. 1, which schematically illustrates a system 100, in accordance with some demonstrative embodiments.

As shown in FIG. 1, in some demonstrative embodiments, system 100 may include one or more wireless communication devices capable of communicating content, data, information and/or signals via a wireless medium (WM) 103. For example, system 100 may include a mobile device 120 (also referred to as "client device") and a wireless docking device 140 (also referred to as "docking station", "Wireless Dock" or "Dock").

In some demonstrative embodiments, wireless medium 103 may include, for example, a radio channel, an RF channel, a WiFi channel, a cellular channel, an IR channel, and the like. One or more elements of system 100 may optionally be capable of communicating over any suitable wired communication links.

In some demonstrative embodiments, device 102 may include a mobile or a portable device.

In some demonstrative embodiments, device 102 may include, for example, a User Equipment (UE), a Mobile device (MD), a wireless Station (STA), a mobile computer, a laptop computer, an Internet of Things (IoT) device, a sensor device, a notebook computer, a tablet computer, an Ultrabook™ computer, a mobile internet device, a handheld computer, a handheld device, a PDA device, a handheld PDA device, an on-board device, an off-board device, a hybrid device (e.g., combining cellular phone functionalities with PDA device functionalities), a consumer device, a mobile or portable device, a mobile phone, a cellular telephone, a PCS device, a PDA device which incorporates a wireless communication device, a mobile or portable GPS device, a relatively small computing device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Personal Media Player (PMP), a digital video camera (DVC), a gaming device, a Smartphone, or the like.

In some demonstrative embodiments, wireless docking device 140 may be connected to one or more peripheral devices ('peripherals') 150.

In some demonstrative embodiments, peripherals 150 may include, for example, an input device, an output device, a display, a keyboard, a pointing device, a mouse, one or more loudspeakers, a Universal Serial Bus (USB) hub, an external storage, a communication device, a Local Area Network (LAN) connector, a printer, and/or any other additional or alternative peripheral device.

In some demonstrative embodiments, docking device 140 may be configured to enable a user of mobile device 102 to use the one or more peripherals 150 to operate, to interact and/or to use mobile device 102, e.g., instead of inputs and/or outputs of a mobile device, for example, to enhance a user experience of the user.

In one example, wireless docking device 140 may enable a user of mobile device 120 to view video content from mobile device 102 on the display. For example, mobile device 120 may include a Smartphone, and wireless docking device 150 may connect the Smartphone to the display, for example, to enable the user of mobile device 120 to watch the video content of the Smartphone on the display.

In another example, mobile device 120 may include a Smartphone having a document stored in a memory of the Smartphone. According to this example, wireless docking device 140 may connect the Smartphone to the keyboard and/or the mouse, for example, to enable the user of mobile device 120 to edit the document, which may be displayed on the display, using the keyboard and/or the mouse.

In some demonstrative embodiments, device 102 may include, for example, one or more of a processor 191, an input unit 192, an output unit 193, a memory unit 194, and/or a storage unit 195; and/or docking device 140 may include, for example, one or more of a processor 181, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of docking device 140 and/or of one or more suitable applications.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by docking device 140.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, wireless communication medium 103 may include a wireless communication channel over a 2.4 GHz frequency band, a 5 GHz frequency band, a millimeterWave (mmWave) frequency band, e.g., a 60 GHz frequency band, a S1G band, and/or any other frequency band.

In some demonstrative embodiments, mobile device 102, and/or wireless docking device 140 may include one or more radios including circuitry and/or logic to perform wireless communication between mobile device 102, wireless docking device 140 and/or one or more other wireless communication devices. For example, mobile device 102 may include a radio 114, and/or wireless docking device 140 may include a radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, a S1G band, a directional band, e.g., an mmWave band, and/or any other band.

In some demonstrative embodiments, radios 114 and/or 144 may include, or may be associated with, one or more antennas 107 and/or 147, respectively.

In one example, mobile device 102 may include a single antenna 107. In another example, mobile device 102 may include two or more antennas 107.

In one example, wireless docking device 140 may include a single antenna 147. In another example, wireless docking device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a docking controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or docking controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, docking controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, docking device 140 may include a message processor 158 configured to generate, process and/or access one or messages communicated by device 140.

In one example, message processor 158 may be configured to generate one or more messages to be transmitted by docking device 140, and/or message processor 158 may be configured to access and/or to process one or more messages received by docking device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of docking controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of docking controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of docking controller 154, one or more elements of message processor 158, and/or one or more elements of radio 144. In one example, docking controller 154, message processor 158, and radio 144 may be implemented as part of the chip or SoC.

In other embodiments, docking controller 154, message processor 158 and/or radio 144 may be implemented by one or more additional or alternative elements of device 140.

In some demonstrative embodiments, mobile device 102 may be configured to receive wireless power signals, for example, to charge a battery of mobile device 102.

In some demonstrative embodiments, mobile device 102 may include a wireless charging power receiver (Rx) 126 configured to receive the wireless power signals.

In some demonstrative embodiments, wireless charging power receiver 126 may be configured to provide power, for example, to the battery of mobile device 102.

In some demonstrative embodiments, system 100 may include a wireless charger 160 configured to provide the wireless power signals to a mobile device, e.g., device 102.

In some demonstrative embodiments, wireless charger 160 may include a wireless charging power transmitter (Tx) 162 configured to transmit wireless power signals, for example, to provide the wireless power signals to the mobile device.

In some demonstrative embodiments, docking device 140 may include wireless charger 160.

In some demonstrative embodiments, wireless charger 160 may be included and/or may be implemented as part of docking device 140.

In some demonstrative embodiments, wireless charger 160 and docking device 140 may be implemented as separate elements and/or devices of system 100.

In some demonstrative embodiments, wireless charger 160 may be logically associated with, e.g., paired with, and/or physically associated with, e.g., physically connected to, the docking device 140.

In some demonstrative embodiments, wireless charger 160 may include one or more elements, for example, to enable wireless charger 160 to provide the wireless charging. For example, wireless charger 160 may include a charging pad or placement, e.g., to enable a user to place the mobile device at a location suitable for receiving the wireless power signals from wireless charging power transmitter 162.

In some demonstrative embodiments, docking device 140 may include a charger interface 166 configured to interface between docking device 140 and wireless charger 160, e.g., as described below.

In some demonstrative embodiments, charger interface 166 may include a wired interface, for example, a reduced bit-rate interface, e.g., a USB interface, an Inter-Integrated Circuit (I2C) interface, and/or the like.

In some demonstrative embodiments, charger interface 166 may include a wireless interface, for example, a reduced bit-rate interface, e.g., a Bluetooth Low Energy (BLE) interface, or the like.

In other embodiments, charger interface 166 may include any other additional or alternative interface. In other embodiments, charger interface 166 may be optional, may not be implemented and/or required, e.g., as described below.

In some demonstrative embodiments, one or more methods, which may be used, for example, to trigger a wireless docking session (also referred to as "docking connection") between a mobile device and a wireless docking device, may have one or more disadvantages, e.g., as described below.

In some demonstrative embodiments, a first method may be based on proximity detection. For example, the mobile device may connect to the docking device, e.g., when the mobile device is close to the docking device.

In some demonstrative embodiments, a second method may be based on a user indication of a user of the mobile device. For example, the user may request connection to the docking device, for example, by clicking a button at an application executed by the mobile device.

In some demonstrative embodiments, an enhanced user experience may be offered by the first method, for example, since the proximity detection does not require any action on behalf of the user, e.g., compared to the second method, which requires one or more operations to be actively performed by the user. However, the first method, which is based only on the proximity detection, may not be able to differentiate between use cases based on whether or not the user actually intents to connect to the docking device, e.g., even if the proximity detection has an increased accuracy.

In one example, the user may stand next to the docking device, any may have no intention to connect to the docking device. According to this example, connecting the mobile device to the docking station based on the proximity detection may result in a bad user experience, and/or potential privacy or security issues.

In some demonstrative embodiments, implementing the proximity detection as the criterion for triggering the docking connection may require the mobile device and the docking device to continuously scan for each other, which may increase a power consumption of the docking device and/or the mobile device, e.g., even when not using the docking connection.

In some demonstrative embodiments, implementing the proximity detection as the criterion for triggering the docking connection may require the user to perform an association process (also referred to as "pairing") between the mobile device and the docking device. The association process may require the user to open an application at the mobile device, which may result in the user experience being more complex and less intuitive.

In some demonstrative embodiments, it may be advantageous, in some use cases, implementations and/or scenarios, to utilize a combination of a wireless charging of mobile device 102 and a wireless docking of mobile device 102, e.g., by docking device 140 and charging device 160. For example, the combination of the wireless docking and the wireless charging may provide an enhanced user experience, e.g., by enabling a wire-free user experience.

In some demonstrative embodiments, devices 102 and 140 may be configured to trigger a docking connection between devices 102 and 140, for example, based on a detection of a wireless charging of device 102 by wireless charger 160, e.g., when placing mobile device 102 on the charging pad, e.g., as described below.

In some demonstrative embodiments, mobile device 102 may be configured to selectively activate radio 114, and/or docking device 140 may be configured to selectively activate radio 144, for example, by switching on radios 114 and/or 144 for a wireless docking session, for example, only after the wireless charging of device 102 is detected, for example, only after the placement of mobile device 102 on the charging pad, e.g., as described below.

In some demonstrative embodiments, devices 102 and 140 may be configured to trigger the wireless connection between devices 102 and 140, for example, in cases when devices 102 and 140 are previously paired and/or associated, e.g., as described below.

In some demonstrative embodiments, devices 102 and 140 may be configured to trigger the wireless connection between devices 102 and 140, for example, in cases when devices 102 and 140 are not previously paired and/or associated, e.g., as described below.

In some demonstrative embodiments, controller 124 may be configured to control, cause and/or trigger device 102 to detect a wireless charging of mobile device 102 by wireless docking device 140, e.g., as described below.

In some demonstrative embodiments, controller 124 may be configured to control, cause and/or trigger device 102 to trigger a wireless docking session between mobile device 102 and the wireless docking device 140, for example, upon detection of the wireless charging, e.g., as described below.

In some demonstrative embodiments, controller 124 may be configured to control, cause and/or trigger device 102 to detect the wireless charging, for example, based on an indication from the wireless charging power receiver 126 of mobile device 102, e.g., as described below.

In some demonstrative embodiments, controller 124 may be configured to control, cause and/or trigger device 102 to trigger the wireless docking session, for example, by triggering radio 114 of mobile device 102 to establish the wireless docking session between mobile device 102 and the wireless docking device 140, e.g., as described below.

In some demonstrative embodiments, controller 124 may be configured to control, cause and/or trigger device 102 to, when the radio 114 is at a power save mode, switch radio 114 to an active mode, for example, upon the detection of the wireless charging of mobile device 102, e.g., as described below.

In some demonstrative embodiments, controller 124 may be configured to control, cause and/or trigger device 102 switch radio 114 to the active mode, for example, only when wireless charging of mobile device 102 is detected, for example, if it is assumed that all wireless docking devices to be used by mobile device 102 are connected to a wireless charger. Such an implementation may enable, for example, significant power saving at mobile device 102.

In some demonstrative embodiments, docking controller 154 may be configured to control, cause and/or trigger device 140 to detect the wireless charging of mobile device 102 by wireless charger 160, e.g., as described below.

In some demonstrative embodiments, docking controller 154 may be configured to control, cause and/or trigger device 102 to trigger the wireless docking session between mobile device 102 and the wireless docking device 140, for example, upon the detection of the wireless charging of mobile device 102, e.g., as described below.

In some demonstrative embodiments, docking controller 154 may be configured to control, cause and/or trigger device 140 to detect the wireless charging, for example, based on an indication from wireless charger 160, e.g., via charger interface 166, e.g., as described below.

In some demonstrative embodiments, docking controller 154 may be configured to control, cause and/or trigger device 140 to trigger the wireless docking session, for example, by triggering radio 144 of docking device 140 to establish the wireless docking session between mobile device 102 and the wireless docking device 140, e.g., as described below.

In some demonstrative embodiments, docking controller 154 may be configured to control, cause and/or trigger device 140 to, when the radio 144 is at a power save mode, switch radio 144 to an active mode, for example, upon the detection of the wireless charging, e.g., as described below.

In some demonstrative embodiments, controller 154 may be configured to control, cause and/or trigger device 140 switch radio 144 to the active mode, for example, when wireless charging of mobile device 102 is detected. Such an implementation may enable, for example, significant power saving at docking device 140.

Figure 2:
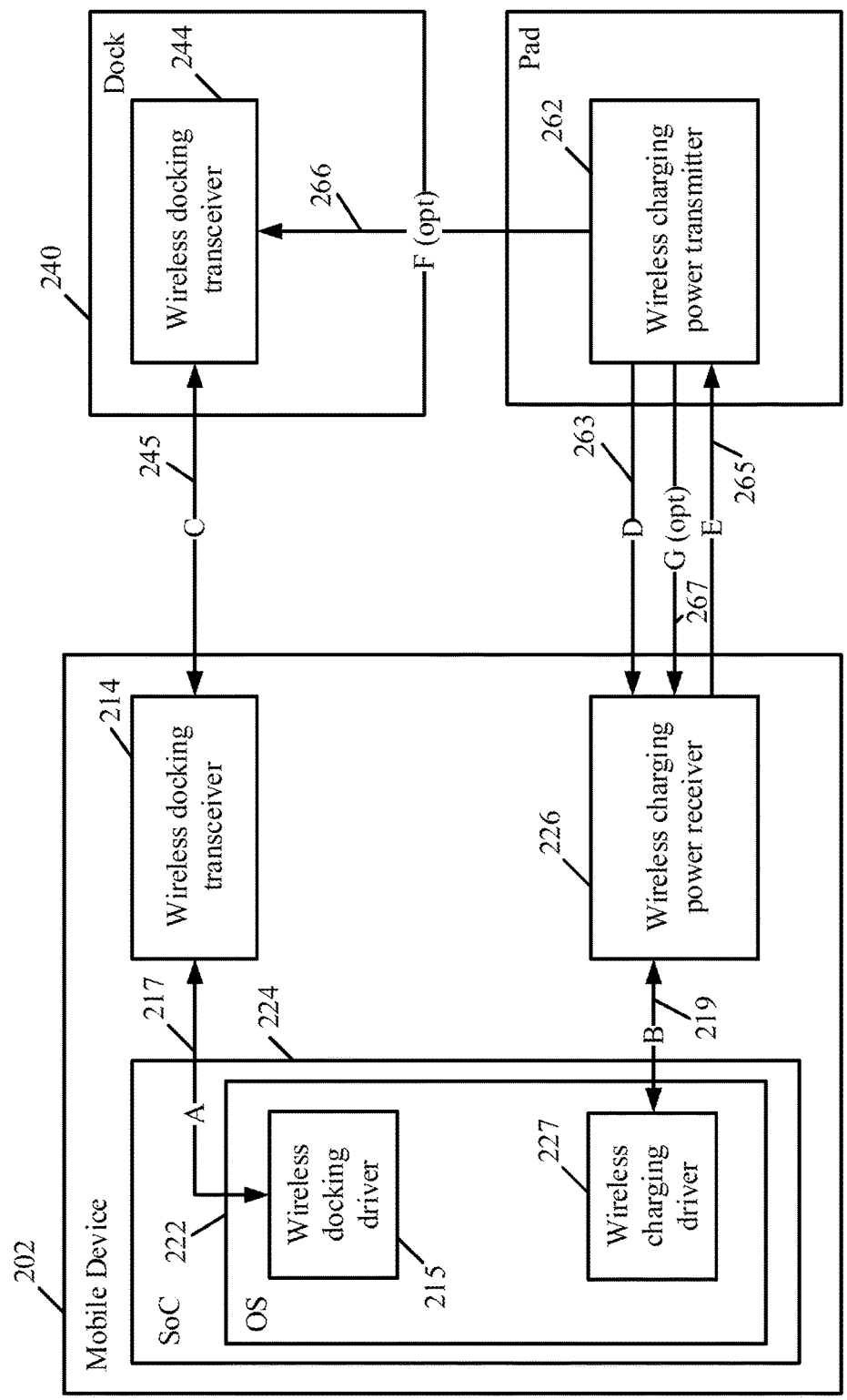
FIG. 2 is a schematic block diagram illustration of components of, and interfaces between, a mobile device, a wireless docking device, and a wireless charger, in accordance with some demonstrative embodiments.

Reference is made to FIG. 2, which schematically illustrates components of, and interfaces between, a mobile device 202, a wireless docking device 240, and a wireless charger 260, in accordance with some demonstrative embodiments. For example, mobile device 202 may perform the functionality of mobile device 102 (FIG. 1), docking device 240 may perform the functionality of docking device 140 (FIG. 1), and/or wireless charger 260 may perform the functionality of wireless charger 160 (FIG. 1).

In some demonstrative embodiments, as shown in FIG. 2, mobile device 202 may include a wireless docking transceiver 214 and/or a wireless charging power receiver 226. For example, wireless docking transceiver 214 may perform the functionality of radio 114 (FIG. 1), and/or wireless charging power receiver 226 may perform the functionality of wireless charging power receiver 126 (FIG. 1).

In some demonstrative embodiments, as shown in FIG. 2, mobile device 202 may include a SoC 224 including logic, e.g., an OS 222. For example, OS 222 may include a wireless docking driver 215, and/or a wireless charging driver 227. For example, one or more elements of SoC 224, OS 222, wireless docking driver 215, and/or wireless charging driver 227, may perform the functionality of, may be implemented by, and/or may be included as part of, controller 124 (FIG. 1), and/or message processor 128 (FIG. 1).

In some demonstrative embodiments, as shown in FIG. 2, mobile device 202 may include an interface 217, denoted A, configured to interface between wireless docking driver 215 and wireless docking transceiver 214, for example, to communicate one or more control messages between wireless docking driver 215 and wireless docking transceiver 214, e.g., as described below.

In some demonstrative embodiments, as shown in FIG. 2, mobile device 202 may include an interface 219, denoted B, configured to interface between wireless charging driver 227 and wireless charging power receiver 226, for example, to communicate one or more control messages between wireless charging driver 227 and wireless charging power receiver 226, e.g., as described below.

In some demonstrative embodiments, as shown in FIG. 2, docking device 240 may include a wireless docking transceiver 244. For example, wireless docking transceiver 244 may include, perform one or more operations of, and/or perform the functionality of, radio 144 (FIG. 1), controller 154 (FIG. 1), and/or message processor 158 (FIG. 1).

In some demonstrative embodiments, as shown in FIG. 2, wireless charger 260 may include a wireless charging power transmitter 262. For example, wireless charging power transmitter 262 may include, perform one or more operations of, and/or perform the functionality of, charging power transmitter 162 (FIG. 1).

In some demonstrative embodiments, as shown in FIG. 2, an interface 266, denoted F, may be configured to interface between wireless charger 260 and docking device 240. For example, interface 266 may be configured at least to transmit one or more control messages from wireless charger 260 to docking device 240. For example, interface 262 may include, perform one or more operations of, and/or perform the functionality of, charger interface 166 (FIG. 1).

In some demonstrative embodiments, as shown in FIG. 2, wireless charging power receiver 226 and/or wireless charging power transmitter 262 may utilize one or more interfaces, for example, to communicate between wireless charging power transmitter 262 and wireless charging power receiver 226, e.g., as described below.

In some demonstrative embodiments, as shown in FIG. 2, an interface 263, denoted D, may be configured to provide wireless power signals from wireless charging power transmitter 262 to wireless charging power receiver 226, for example, to charge a battery of device 202.

In some demonstrative embodiments, as shown in FIG. 2, an interface 265, denoted E, may be configured to wirelessly transmit one or more wireless control messages from wireless charging power receiver 226 to wireless charging power transmitter 262, for example, by modulating a load on the wireless power signals from wireless charging power transmitter 262, e.g., using a load modulation mechanism, e.g., in accordance with PMA Specifications and/or QI Specifications. In other embodiments, interface 265 may utilize any other additional or alternative mechanism to transmit the wireless control signals from wireless charging power receiver 226 to wireless charging power transmitter 262.

In some demonstrative embodiments, as shown in FIG. 2, an interface 267, denoted G, may be configured to transmit one or more control messages from wireless charging power transmitter 262 to wireless charging power receiver 226, for example, by modulating the wireless power signals from wireless charging power transmitter 262. In one example, interface 267 may utilize an Amplitude-shift keying (ASK) or a Frequency-shift keying (FSK) modulation, for example, to modulate an input voltage to an inverter of charging power transmitter 262. In other embodiments, interface 267 may utilize any other additional or alternative mechanism to transmit the wireless control signals from wireless charging power transmitter 262 to wireless charging power receiver 226.

In some demonstrative embodiments, in some cases interface 267 and/or interface 266 may be optionally implemented or utilized, for example, in some implementations, use cases and/or scenarios, e.g., as described below.

In some demonstrative embodiments, wireless charger 260 and docking device 240 may be manufactures and/or sold as a bundled product.

In some demonstrative embodiments, wireless charger 260 and docking device 240 may be manufactured and/or sold as separate devices or products, which may later be connected to each other by a user, e.g., using a pairing process.

In one example, wireless charger 260 and docking device 240 may be implemented as a bundled product, which may be labeled as a "charging and docking" pad. For example, a user of the bundled product may expect to be able to connect a mobile device to the docking device when placing the mobile device on a charging pad of the bundled product.

In some demonstrative embodiments, in some use cases, deployments, scenarios, and/or implementations, it may be assumed that docking device 240 is not connected to any sensitive peripherals or networks, such that any mobile device that attempts to connect to the docking device 240 may be allowed to connect to docking device 240. In other embodiments, one or more privacy mechanisms may be utilized, for example, to secure privacy with respect to one or more sensitive peripherals and/or networks.

Referring back to FIG. 1, in some demonstrative embodiments, according to a first scenario, devices 102 and/or 140 may trigger the wireless docking session based, for example, on an identifier (ID) of device 102, which may be transmitted from mobile device 102 to the docking device 140, e.g., using the interface 265 and/or the interface 266 (FIG. 2),e.g., as described below. In some implementations, the first scenario may be implemented, for example, even without using interface 267 (FIG. 2), e.g., as described below.

In some demonstrative embodiments, according to a second scenario, devices 102 and/or 140 may trigger the wireless docking session based on an identifier (ID) of docking device 140, which may be transmitted from wireless charger 160 to the mobile device 102, e.g., using the interface 267 (FIG. 2), e.g., as described below. In some implementations, the second scenario may be implemented, for example, even without using interface 266 (FIG. 2), e.g., as described below.

In some demonstrative embodiments, according to a third scenario, devices 102 and/or 140 may trigger the wireless docking session, e.g., based on a previous association (pairing) between devices 102 and 140. In some implementations, the third scenario may be implemented, for example, even without using interfaces 266 and/or 267 (FIG. 2) e.g., as described below.

In some demonstrative embodiments, for example, according to the first implementation scenario, controller 124 may be configured to control, cause and/or trigger device 102 to trigger wireless charging power receiver 126 of mobile device 102 to send to the docking device 140 a mobile device identifier corresponding to mobile device 102, e.g., as described below.

In some demonstrative embodiments, the mobile device identifier may include, for example, a Personal Identification Number (PIN) of device 102.

In one example, the PIN may include a one-time PIN. For example, interface 265 and/or interface 266 (FIG. 2) may be secured, e.g., to prevent the PIN from being intercepted by another user.

In other embodiments, the mobile device ID may include any other identifier, e.g., a random identifier or a preconfigured identifier.

In some demonstrative embodiments, controller 124 may be configured to control, cause and/or trigger the wireless charging power receiver 126 to send the mobile device identifier to the docking device, for example, by applying a load modulation to the wireless charging signals from wireless charger 160, e.g., via interface 265 (FIG. 2).

In some demonstrative embodiments, docking device 140 may receive the mobile device identifier from device 102, e.g., as described below.

In some demonstrative embodiments, docking controller 154 may be configured to control, cause and/or trigger device 140 to process the mobile device identifier from the wireless charger 160, for example, via charger interface 166.

In some demonstrative embodiments, docking controller 154 may be configured to control, cause and/or trigger wireless charger 160 to process receipt of the mobile device identifier from mobile device 102, for example, via interface 265 (FIG. 2).

In some demonstrative embodiments, both devices 102 and 140 may start a discovery process to search for each other, e.g., once docking device 140 receives the mobile device identifier from mobile device 102.

In one example, device 102 may search for a wireless docking device, which knows the mobile device identifier of device 102.

In another example, docking device 140 may search for a mobile device having the mobile device identifier, which was received from wireless charger 160.

In some demonstrative embodiments, mobile device 102 may be configured to transmit one or more discovery messages including a first value, which is based on the mobile device identifier of mobile device 102, e.g., as described below.

In some demonstrative embodiments, docking device 140 may be configured to transmit one or more discovery messages including a second value, which is based on the mobile device identifier of mobile device 102, e.g., as described below.

In some demonstrative embodiments, controller 124 may be configured to control, cause and/or trigger radio 114 to transmit to the docking device 140 one or more discovery messages including the first value, which is based on the mobile device identifier of mobile device 102, e.g., as described below.

In some demonstrative embodiments, docking controller 154 may be configured to control, cause and/or trigger radio 144 to transmit to the mobile device 102 one or more discovery messages including the second value, which is based on the mobile device identifier of mobile device 102, e.g., as described below.

In some demonstrative embodiments, controller 124 may be configured to control, cause and/or trigger radio 114 to transmit to the docking device 140 a first discovery message including a first hash value based on the mobile device identifier and a first predefined string, e.g., as described below.

In some demonstrative embodiments, docking controller 154 may be configured to control, cause and/or trigger radio 144 to process the first discovery message from the mobile device 102 including the first hash value, which is based on the mobile device identifier and the first predefined string, e.g., as described below.

In some demonstrative embodiments, docking controller 154 may be configured to control, cause and/or trigger radio 144 to transmit to mobile device 102 a second discovery message including a second hash value, which is based on the mobile device identifier of mobile device 102 and the second predefined string, e.g., as described below.

In some demonstrative embodiments, controller 124 may be configured to control, cause and/or trigger radio 114 to process the second discovery message from the docking device 140 including a second hash value based on the mobile device identifier and the second predefined string, e.g., as described below.

In some demonstrative embodiments, the first discovery message may include a probe request, e.g., from mobile device 102 to docking device 140, and/or the second discovery message may include a probe response, e.g., from docking device 140 to mobile device 102, for example, in response to the probe request, e.g., as described below.

In some demonstrative embodiments, the second discovery message may include a probe request, e.g., from docking device 140 to mobile device 102, and/or the first discovery message may include a probe response, e.g., from mobile device 102 to docking device 140, for example, in response to the probe request, e.g., as described below.

In some demonstrative embodiments, the first and second predefined strings may include two different strings, e.g., as described below. In other embodiments, the first and second predefined strings may include the same string.

In one example, the first predefined string may be defined as the string "client", and/or the second predefined string may be defined as the string "dock". In other embodiments, any other strings may be used.

In some demonstrative embodiments, the first hash value may include a hash value of the PIN concatenated with the first predefined string, e.g., Hash (PIN+"client").

In some demonstrative embodiments, the second hash value may include a hash value of the PIN concatenated with the second predefined string, e.g., Hash (PIN+"dock").

In some demonstrative embodiments, the hash utilized for generating the first and second hash values may represent a one-way mathematical function, e.g., a Secure Hash Algorithm 256 (SHA-256), or any other hash function.

In some demonstrative embodiments, mobile device 102 may be configured to calculate the second hash value, for example, to verify docking device 140, e.g., based on the second hash value received from docking device 140.

In some demonstrative embodiments, docking device 140 may be configured to calculate the first hash value, for example, to verify mobile device 102, e.g., based on the first hash value received from mobile device 102.

In some demonstrative embodiments, transmitting the first and second hash values between devices 102 and 140, e.g., instead of transmitting the PIN, may prevent exposure of the PIN, for example, to other users.

In some demonstrative embodiments, mobile device 102 may attempt to associate with a docking device, e.g., only with a docking device, that has a correct hash value, for example, the second hash value corresponding to docking device 140, e.g., the docking device 140, which includes, or is connected to, the charging device 160, which is charging the mobile device 102, for example, while mobile device 102 may select not to attempt a connection with another docking device.

In some demonstrative embodiments, controller 124 may be configured to control, cause and/or trigger mobile device 102 to associate with the docking device 140, for example, based on the second hash value.

In some demonstrative embodiments, docking controller 154 may be configured to control, cause and/or trigger mobile device 140 to associate with the docking device 102, for example, based on the first hash value.

In some demonstrative embodiments, devices 102 and 140 may perform one or more operations and/or communications of an association process, e.g., to pair between devices 102 and 140.

In some demonstrative embodiments, controller 124 may be configured to control, cause and/or trigger radio 114 to establish a secure connection between mobile device 102 and the wireless docking device 140 according to a Wi-Fi Protected Setup Personal Identification Number (WPS-PIN) protocol, for example, using the mobile device identifier, e.g., as described below. In other embodiments, controller 124 may be configured to trigger mobile device 102 to establish the secure connection between mobile device 102 and the wireless docking device 140 according to any other mechanism and/or protocol.

In one example, the WPS-PIN protocol may be based on a WiFi Simple configuration (WSC) protocol, e.g., in accordance with a WFA Specification.

In some demonstrative embodiments, docking controller 154 may be configured to control, cause and/or trigger radio 144 to establish the secure connection between mobile device 102 and the wireless docking device 140, e.g., according to the WPS-PIN protocol, for example, using the mobile device identifier. In other embodiments, controller 154 may be configured to trigger docking device 140 to establish the secure connection between mobile device 102 and the wireless docking device 140 according to any other mechanism and/or protocol.

In some demonstrative embodiments, the WPS-PIN protocol may be configured to protect the mobile device 102, for example, from a malicious docking device, which may intercept the one or more discovery messages, e.g., including the hash values, and which may replay the intercepted one or more discovery messages to the mobile device 102.

In some demonstrative embodiments, triggering the wireless docking session between devices 102 and 140, based on the detection of the wireless charging of mobile device 102, e.g., as described above, may enable, for example, to enhance privacy of a user of mobile device 102, may reduce a power consumption of devices 102 and 140, may enhance a user experience of the user of mobile device and/or may provide one or more additional benefits.

Figure 3:
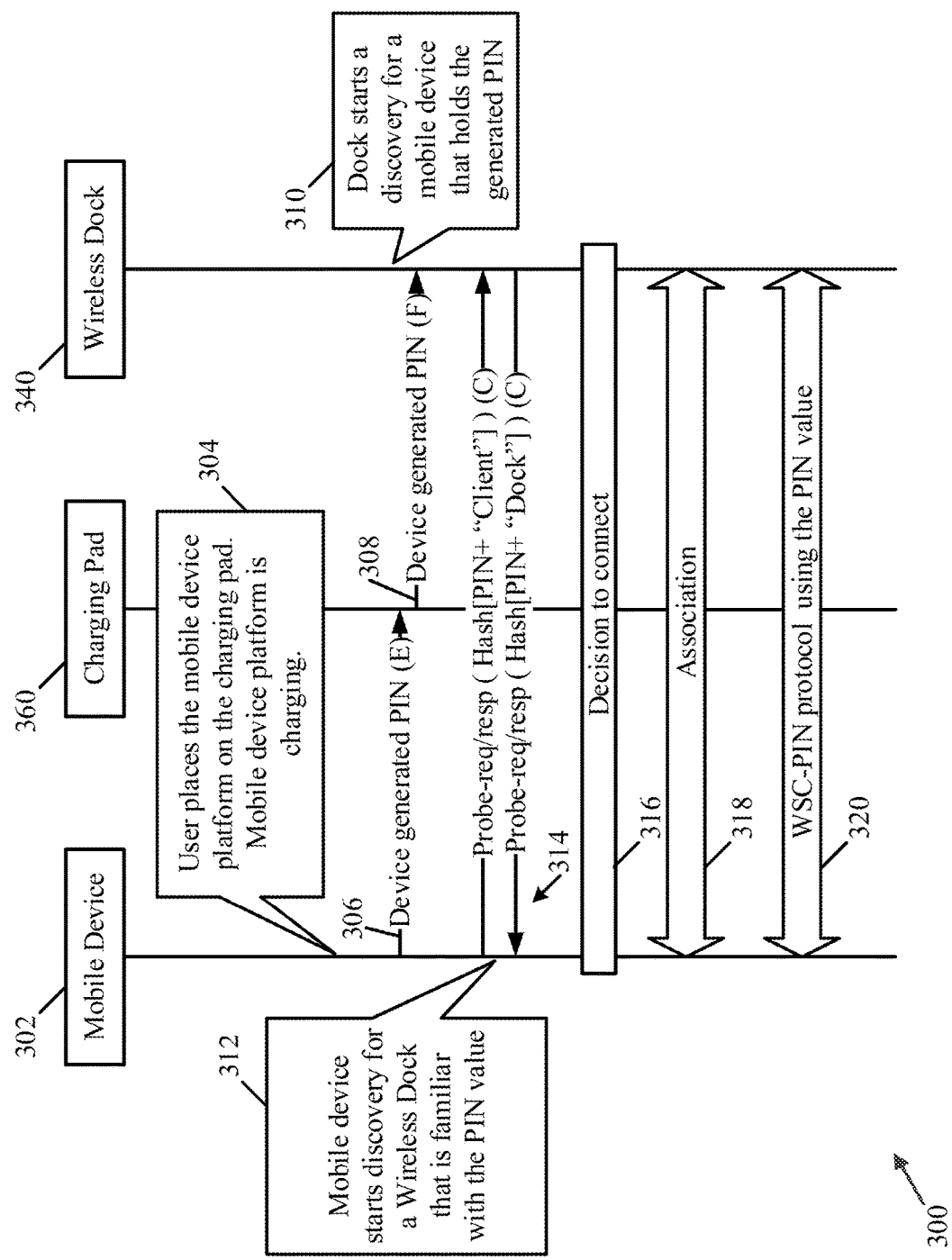
FIG. 3 is a schematic illustration of a sequence diagram of operations and communications between a mobile device, a wireless charger, and a wireless docking device, in accordance with some demonstrative embodiments.

Reference is made to FIG. 3, which schematically illustrates a sequence diagram 300 of operations and communications between a mobile device 302, a wireless charger ("charging pad") 360 and a wireless docking device ("Wireless Dock") 340, in accordance with some demonstrative embodiments. For example, mobile device 302 may perform the functionality of mobile device 102 (FIG. 1), docking device 340 may perform the functionality of docking device 140 (FIG. 1), and/or wireless charger 360 may perform the functionality of wireless charger 160 (FIG. 1).

In some demonstrative embodiments, one or more of the operations and/or communications of sequence diagram 300 may be implemented, for example, with respect to the first implementation scenario, e.g., as described below.

In some demonstrative embodiments, as shown in FIG. 3, a user of mobile device 302 may perform an operation 304 of initiating a charging of the mobile device 302, for example, by placing the mobile device 302 on a charging pad of wireless charger 360.

In one example, a wireless transceiver of mobile device 302, e.g., radio 114 (FIG. 1), may be turned on, e.g., from a power save mode, for example, when the mobile device 302 is placed on the charging pad, e.g., as described above.

In some demonstrative embodiments, as shown in FIG. 3, mobile device 302 may transmit (306) a mobile device identifier, e.g., the PIN of mobile device 302, to wireless charger 360, for example, via interface 265 (FIG. 2), e.g., as described above.

In some demonstrative embodiments, as shown in FIG. 3, wireless charger 360 may send (308) the mobile device identifier to wireless docking device 340, for example, via interface 266 (FIG. 2), e.g., as described above.

In one example, a wireless transceiver of docking device 340, e.g., radio 144 (FIG. 1), may be turned on, e.g., from a power save mode, for example, when the mobile device identifier is received from wireless charger 360, e.g., as described above.

In some demonstrative embodiments, as shown in FIG. 3, mobile device 302 may initiate a discovery process 312 to discover a wireless dock, which has possession of the mobile device identifier, for example, by exchanging one or more probe request and/or probe response messages (314).

In some demonstrative embodiments, as shown in FIG. 3, docking device 340 may initiate a discovery process 310 to discover a mobile device, which holds the mobile device identifier, e.g., upon receiving the mobile device identifier from wireless docking device 340, for example, by exchanging the one or more probe request and/or probe response messages (314).

In some demonstrative embodiments, as shown in FIG. 3, docking device 340 may transmit a discovery message, e.g., a probe request or a probe response, including the hash value, which is based on the mobile device identifier and the string "Dock", for example, via the interface 245 (FIG. 2), e.g., as described above.

In some demonstrative embodiments, as shown in FIG. 3, mobile device 302 may transmit a discovery message, e.g., a probe request or a probe response, including the hash value, which is based on the mobile device identifier and the string "Client", for example, via the interface 245 (FIG. 2), e.g., as described above.

In some demonstrative embodiments, as shown in FIG. 3, mobile device 302 and/or docking device 340 may decide (316) whether or not to connect to each other, for example, based on the hash values communicated in discovery messages 314, e.g., as described above.

In some demonstrative embodiments, as shown in FIG. 3, mobile device 302 and docking device 340 may perform an association process 318, for example, to pair between mobile device 302 and docking device 340, for example, if mobile device 302 verifies docking device 340, e.g., based on the hash value received in the discovery message from docking device 340, and/or if docking device 340 verifies mobile device 302, e.g., based on the hash value received in the discovery message from mobile device 302, as described above.

In some demonstrative embodiments, as shown in FIG. 3, mobile device 302 and docking device 340 may perform operations of a WPS-PIN protocol 320, for example, to establish a secure connection between mobile device 302 and docking device 340, e.g., as described above.

Referring back to FIG. 1, in some demonstrative embodiments, for example, according to the second implementation scenario, devices 102 and 140 may trigger the wireless docking session based on an identifier (ID) of docking device 140 ("Dock ID"), which may be transmitted from wireless charger 160 to the mobile device 102, e.g., using the interface 267 (FIG. 2), for example, even without using the interfaces 265 and/or 266 (FIG. 2), e.g., as described below.

In some demonstrative embodiments, docking controller 154 may be configured to control, cause and/or trigger the wireless charger 160 to send to mobile device 102 a docking device identifier corresponding to the docking device 140, e.g., as described below.

In some demonstrative embodiments, the docking device identifier may include a PIN of docking device 140. In other embodiments, the docking device identifier may include any other random or preconfigured identifier.

In one example, wireless charger 160 may have the docking device identifier internally stored or preconfigured, for example, if wireless charger 160 and docking device 140 are implemented as a bundled product.

For example, the docking device identifier may be securely stored at wireless charger 160, for example, during production of docking device 140 and wireless charger 160.

In another example, wireless charger 160 may receive and store the docking device identifier from docking device 140, for example, as part of a pairing process between the wireless charger 160 and docking device 140, e.g., if wireless charger 160 and docking device 140 are implemented separately.

In one example, interface 267 (FIG. 2) may be secured, for example, to allow communicating the docking device identifier without interception by another mobile device.

In some demonstrative embodiments, mobile device 102 may receive the docking device identifier from docking device 140, e.g., as described below.

In some demonstrative embodiments, mobile device 102 may receive the docking device identifier from wireless charger 160, e.g., as described below.

In some demonstrative embodiments, docking controller 154 may be configured to control, cause and/or trigger the wireless charger 160 to send the docking device identifier to the mobile device, for example, by modulating wireless power signals transmitted from wireless charger 160 to mobile device 102, e.g., via interface 267 (FIG. 2).

In some demonstrative embodiments, controller 124 may be configured to control, cause and/or trigger wireless charging power receiver 126 to process the docking device identifier from the wireless charger 160, for example, via interface 267 (FIG. 2).

In some demonstrative embodiments, controller 124 may be configured to control, cause and/or trigger the wireless charging power receiver 126 to process the docking device identifier, for example, by demodulating the wireless power signals received from the wireless charger 160, for example, via interface 267 (FIG. 2).

In some demonstrative embodiments, both devices 102 and 140 may start a discovery process to search for each other, e.g., once mobile device 102 receives the docking device identifier from docking device 140.

In some demonstrative embodiments, docking device 140 may search for a mobile device, which knows the docking device identifier of docking device 140.

In some demonstrative embodiments, mobile device 102 may search for a docking device, having the docking device identifier, which was received by wireless charging power receiver 126.

In some demonstrative embodiments, docking device 140 may be configured to transmit one or more discovery messages including a first value, which is based on the docking device identifier of docking device 140, e.g., as described below.

In some demonstrative embodiments, mobile device 102 may be configured to transmit one or more discovery messages including a second value, which is based on the docking device identifier of docking device 140, e.g., as described below.

In some demonstrative embodiments, docking controller 154 may be configured to control, cause and/or trigger radio 144 to transmit to the mobile device 102 one or more discovery messages including the first value, which is based on the docking device identifier of docking device 140, e.g., as described below.

In some demonstrative embodiments, controller 124 may be configured to control, cause and/or trigger radio 114 to transmit to the docking device 140 one or more discovery messages including the second value, which is based on the docking device identifier of docking device 140, e.g., as described below.

In some demonstrative embodiments, docking controller 154 may be configured to control, cause and/or trigger radio 144 to transmit to the mobile device 102 a first discovery message including a first hash value based on the docking device identifier and a first predefined string, e.g., as described below.

In some demonstrative embodiments, controller 124 may be configured to control, cause and/or trigger radio 114 to process the first discovery message from the docking device 140 including the first hash value, which is based on the docking device identifier and the first predefined string, e.g., as described below.

In some demonstrative embodiments, controller 124 may be configured to control, cause and/or trigger radio 114 to transmit to docking device 140 a second discovery message including a second hash value, which is based on the docking device identifier of docking device 140 and the second predefined string, e.g., as described below.

In some demonstrative embodiments, docking controller 154 may be configured to control, cause and/or trigger radio 144 to process the second discovery message from the mobile device 102 including the second hash value based on the docking device identifier and the second predefined string, e.g., as described below.

In some demonstrative embodiments, the first discovery message may include a probe request, e.g., from docking device 140 to mobile device 102, and/or the second discovery message may include a probe response, e.g., from mobile device 102 to docking device 140, for example, in response to the probe request, e.g., as described below.

In some demonstrative embodiments, the second discovery message may include a probe request, e.g., from mobile device 102 to docking device 140 from docking device 140 to mobile device 102, and/or the first discovery message may include a probe response, e.g., from docking device 140 to mobile device 102, for example, in response to the probe request, e.g., as described below.

In some demonstrative embodiments, the first and second predefined strings may include different strings, e.g., as described below. In other embodiments, the first and second predefined strings may include the same string.

In one example, the first predefined string may be defined as the string "dock", and/or the second predefined string may be defined as the string "client". In other embodiments, any other strings may be used.

In some demonstrative embodiments, the first hash value may include a hash value of the PIN concatenated with the first predefined string, e.g., Hash (dock ID+"dock").

In some demonstrative embodiments, the second hash value may include a hash value of the PIN concatenated with the second predefined string, e.g., Hash (dock ID+"client").

In some demonstrative embodiments, the hash utilized for generating the first and second hash values may represent a one-way mathematical function, e.g., a SHA-256 algorithm, or any other hash function.

In some demonstrative embodiments, docking device 140 may be configured to calculate the second hash value, for example, to verify mobile device 102, e.g., based on the second hash value received from mobile device 102.

In some demonstrative embodiments, mobile device 102 may be configured to calculate the first hash value, for example, to verify docking device 140, e.g., based on the first hash value received from docking device 140.

In some demonstrative embodiments, transmitting the first and second hash values between devices 102 and 140, e.g., instead of transmitting the PIN of the dock, may prevent exposure of the PIN of the dock, for example, to other users.

In some demonstrative embodiments, docking device 140 may attempt to associate with a mobile device, e.g., only with a mobile device, that has a correct hash value, for example, the second hash value corresponding to mobile device 102, e.g., the mobile device, which is being charged by wireless charger 160, for example, while docking device 140 may select not to attempt a connection with another mobile device, e.g., which is not being charged by wireless charger 160.

In some demonstrative embodiments, docking controller 154 may be configured to control, cause and/or trigger mobile device 140 to associate with the mobile device 102, for example, based on the second hash value.

In some demonstrative embodiments, controller 124 may be configured to control, cause and/or trigger mobile device 102 to associate with the docking device 140, for example, based on the first hash value.

In some demonstrative embodiments, devices 102 and 140 may perform one or more operations and/or communications of an association process, e.g., to pair between devices 102 and 140.

In some demonstrative embodiments, docking controller 154 may be configured to control, cause and/or trigger radio 144 to establish the secure connection between mobile device 102 and the wireless docking device 140, e.g., according to the WPS-PIN protocol, for example, using the docking device identifier, e.g., as described below. In other embodiments, controller 154 may be configured to trigger docking device 140 to establish the secure connection between mobile device 102 and the wireless docking device 140 according to any other mechanism and/or protocol.

In some demonstrative embodiments, controller 124 may be configured to control, cause and/or trigger radio 114 to establish a secure connection between mobile device 102 and the wireless docking device 140 according to the WPS-PIN protocol, for example, using the docking device identifier. In other embodiments, controller 124 may be configured to trigger mobile device 102 to establish the secure connection between mobile device 102 and the wireless docking device 140 according to any other mechanism and/or protocol.

In some demonstrative embodiments, the WPS-PIN protocol may be configured to protect docking device 140, for example, from a malicious mobile device, which may intercept the one or more discovery messages and may replay the intercepted one or more discovery messages to docking device 140, e.g., to pretend to be mobile device 102.

Figure 4:
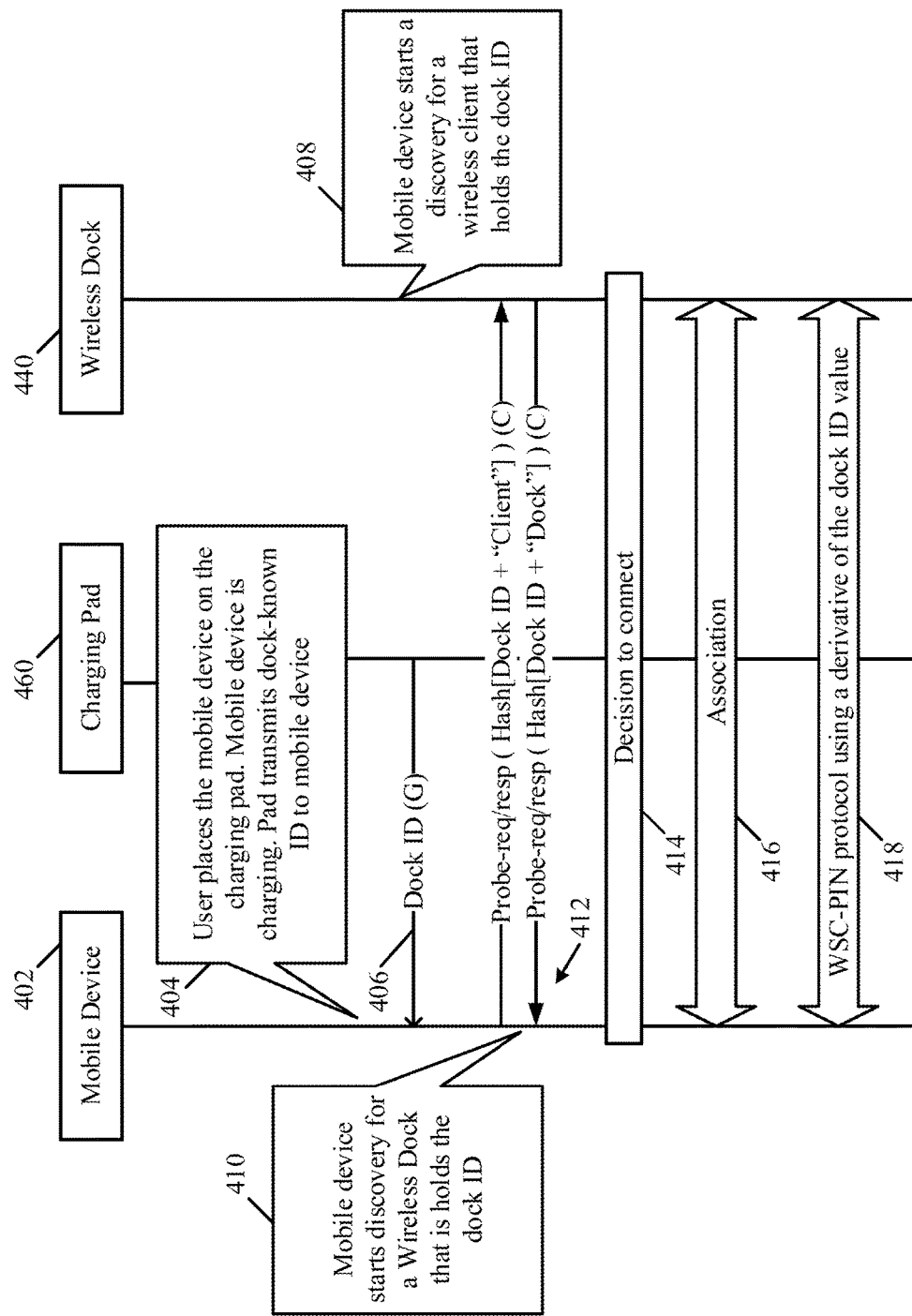
FIG. 4 is a schematic illustration of a sequence diagram of operations and communications between a mobile device, a wireless charger, and a wireless docking device, in accordance with some demonstrative embodiments.

Reference is made to FIG. 4, which schematically illustrates a sequence diagram 400 of operations and communications between a mobile device 402, a wireless charger ("charging pad") 460 and a wireless docking device ("Wireless Dock") 440, in accordance with some demonstrative embodiments. For example, mobile device 402 may perform the functionality of mobile device 102 (FIG. 1), docking device 440 may perform the functionality of docking device 140 (FIG. 1), and/or wireless charger 460 may perform the functionality of wireless charger 160 (FIG. 1).

In some demonstrative embodiments, one or more of the operations and/or communications of sequence diagram 400 may be implemented, for example, with respect to the second implementation scenario, e.g., as described below.

In some demonstrative embodiments, as shown in FIG. 4, a user of mobile device 402 may perform an operation 404 of initiating a charging of the mobile device 402, for example, by placing the mobile device 402 on a charging pad of wireless charger 460.

In one example, a wireless transceiver of mobile device 402, e.g., radio 114 (FIG. 1), may be turned on, e.g., from a power save mode, for example, when the mobile device 402 is placed on the charging pad, e.g., as described above.

In some demonstrative embodiments, as shown in FIG. 4, wireless charger may transmit (406) a docking device identifier, e.g., the PIN ("Dock ID") of docking device 440, to mobile device 402, for example, via interface 267 (FIG. 2), e.g., as described above.

In some demonstrative embodiments, as shown in FIG. 4, docking device 440 may initiate a discovery process 408 to discover a mobile device, which knows the docking device identifier, for example, by exchanging one or more probe request and/or probe response messages (412), e.g., as described above.

In some demonstrative embodiments, as shown in FIG. 4, mobile device 402 may initiate a discovery process 410 to discover a docking device, which holds the docking device identifier, e.g., upon receiving the docking device identifier from wireless charger 460, for example, by exchanging the one or more probe request and/or probe response messages (414).

In some demonstrative embodiments, as shown in FIG. 4, docking device 440 may transmit a discovery message, e.g., a probe request or a probe response, including the hash value, which is based on the docking device identifier and the string "Dock", for example, via the interface 245 (FIG. 2), e.g., as described above.

In some demonstrative embodiments, as shown in FIG. 4, mobile device 402 may transmit a discovery message, e.g., a probe request or a probe response, including the hash value, which is based on the docking device identifier and the string "Client", for example, via the interface 245 (FIG. 2), e.g., as described above.

In some demonstrative embodiments, as shown in FIG. 4, mobile device 402 and/or docking device 440 may decide (416) whether or not to connect to each other, for example, based on the hash values communicated in discovery messages 412, e.g., as described above.

In some demonstrative embodiments, as shown in FIG. 4, mobile device 402 and docking device 440 may perform an association process 416, for example, to pair between mobile device 402 and docking device 440, for example, if mobile device 402 verifies docking device 440, e.g., based on the hash value received in the discovery message from docking device 440, and/or if docking device 440 verifies mobile device 402, e.g., based on the hash value received in the discovery message from mobile device 402, e.g., as described above.

In some demonstrative embodiments, as shown in FIG. 4, mobile device 402 and docking device 440 may perform operations of a WPS-PIN protocol 418, for example, to establish a secure connection between mobile device 402 and docking device 440, e.g., as described above.

Referring back to FIG. 1, in some demonstrative embodiments, for example, according to the third implementation scenario, devices 102 and 140 may trigger the wireless docking session, for example, based on a previous association between devices 102 and 140, for example, when devices 102 and 140 are previously associated, e.g., paired.

In some demonstrative embodiments, for example, when utilizing the third implementation scenario, there may be no need to use the docking device identifier of docking device 140 and/or the mobile device identifier of mobile device 102. According to these embodiments, the wireless session between devices 102 and/or 140 may be implemented, for example, even without using interface 265, interface 266, and/or interface 267 (FIG. 2), e.g., as described below.

In some demonstrative embodiments, controller 124 may be configured to control, cause and/or trigger mobile device 102 to, upon detection of the wireless charging, establish a secure session between mobile device 102 and the wireless docking device 140, for example, based on one or more security keys of a previous secure session between mobile device 102 and the wireless docking device 140, e.g., as described below.

In some demonstrative embodiments, docking controller 154 may be configured to control, cause and/or trigger docking device 140 to, upon detection of the wireless charging, establish a secure session between mobile device 102 and the wireless docking device 140, for example, based on the one or more security keys of the previous secure session between mobile device 102 and the wireless docking device 140, e.g., as described below.

In some demonstrative embodiments, mobile device 102 and/or docking device 140 may be configured to perform operations and/or communications of a 4-way handshake process, e.g., in accordance to an IEEE 802.11 Standard or any other process, for example, once mobile device 102 identifies a previously paired docking device, e.g., using security materials generated during a WiFi Protected Setup (WPS), for example, during a previous pairing process.

Figure 5:
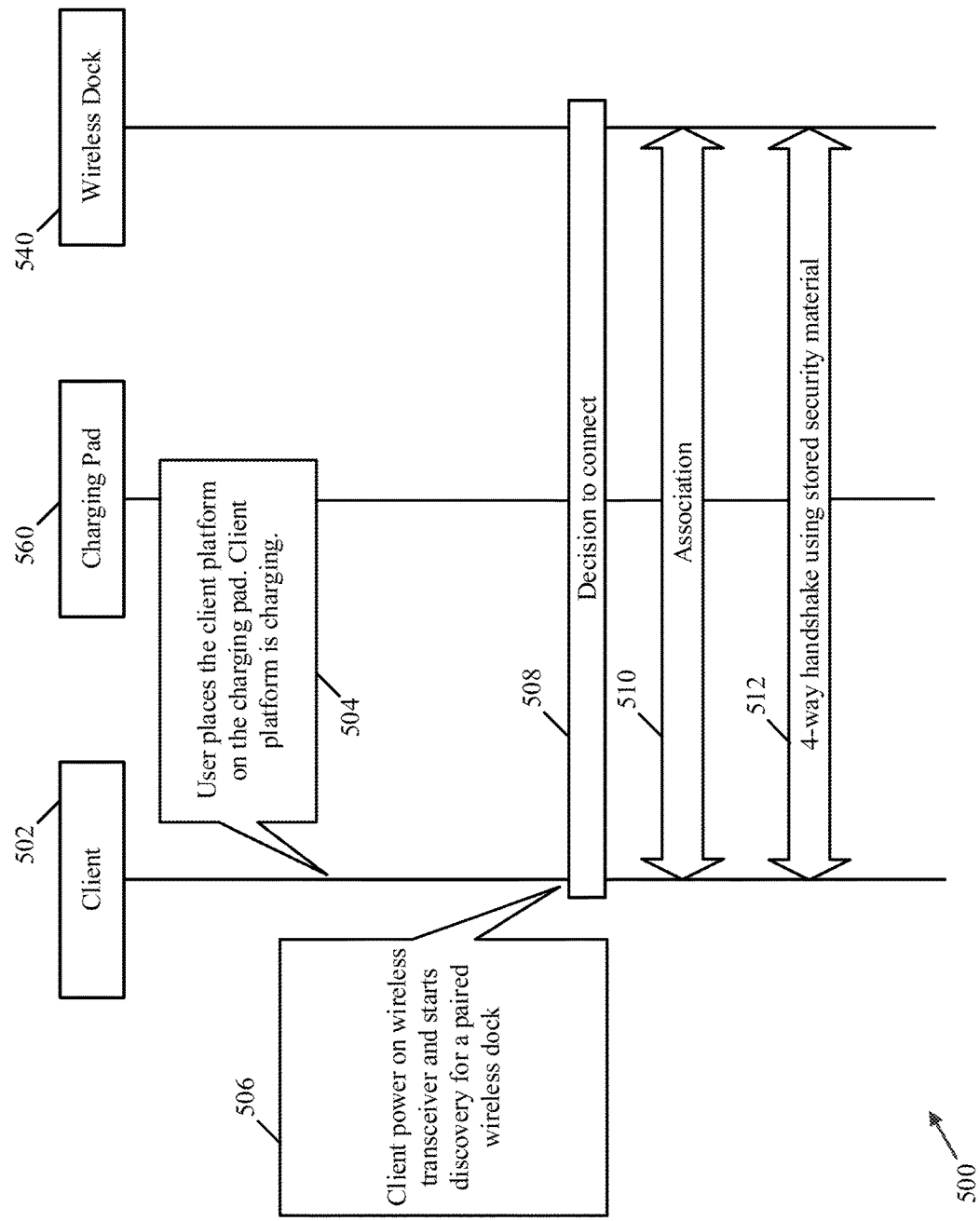
FIG. 5 is a schematic illustration of a sequence diagram of operations and communications between a mobile device, a wireless charger, and a wireless docking device, in accordance with some demonstrative embodiments.

Reference is made to FIG. 5, which schematically illustrates a sequence diagram 500 of operations and communications between a mobile device 502, a wireless charger ("charging pad") 560 and a wireless docking device ("Wireless Dock") 550, in accordance with some demonstrative embodiments. For example, mobile device 502 may perform the functionality of mobile device 102 (FIG. 1), docking device 540 may perform the functionality of docking device 140 (FIG. 1), and/or wireless charger 560 may perform the functionality of wireless charger 160 (FIG. 1).

In some demonstrative embodiments, one or more of the operations and communications of sequence diagram 500 may be implemented, for example, with respect to the third implementation scenario, e.g., as described below.

In some demonstrative embodiments, as shown in FIG. 5, a user of mobile device 502 may perform an operation 504 of initiating a charging of the mobile device 502, for example, by placing the mobile device 502 on a charging pad of wireless charger 560.

In one example, a wireless transceiver of mobile device 502, e.g., radio 114 (FIG. 1), may be turned on, e.g., from a power save mode, for example, when the mobile device 502 is placed on the charging pad, e.g., as described above.

In some demonstrative embodiments, as shown in FIG. 5, mobile device 502 may initiate a discovery process 506 to discover a previously paired docking device, e.g., as described above.

In some demonstrative embodiments, as shown in FIG. 5, mobile device 502 and docking device 540 may decide (508) to connect to each other, for example, once the previously paired docking device is identified.

In some demonstrative embodiments, as shown in FIG. 5, mobile device 502 and docking device 540 may perform an association process 510, for example, to associate between mobile device 502 and docking device 540, e.g., as described above.

In some demonstrative embodiments, as shown in FIG. 5, mobile device 502 and docking device 540 may perform operations of a 4-way handshake process 512, for example, to establish a secure connection between mobile device 502 and docking device 540, for example, using security information, e.g., one or more keys, which were generated during a previous pairing process between mobile device 502 and docking device 540, e.g., as described above.

Figure 6:
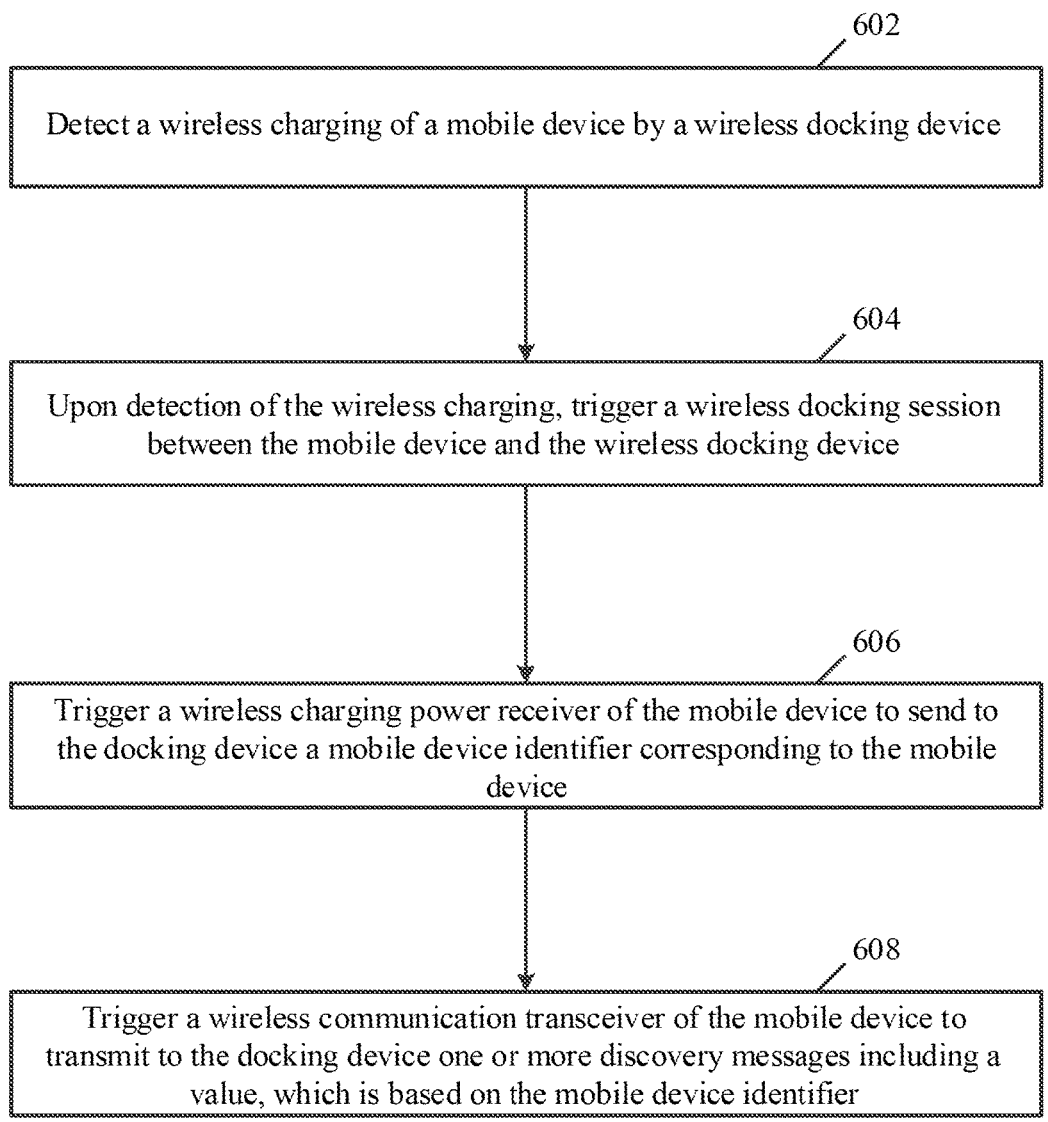
FIG. 6 is a schematic flow-chart illustration of a method triggering a wireless docking session between a mobile device and a wireless docking device, in accordance with some demonstrative embodiments.

Reference is made to FIG. 6, which schematically illustrates a method of triggering a wireless docking session between a mobile device and a wireless docking device, in accordance with some demonstrative embodiments. For example, one or more of the operations of the method of FIG. 6 may be performed by one or more elements of a system, e.g., system 100 (FIG. 1), for example, one or more wireless devices, e.g., mobile device 102 (FIG. 1) and/or docking device 140 (FIG. 1); a wireless charger, e.g., wireless charger 160 (FIG. 1); a controller, e.g., controller 124 (FIG. 1) and/or docking controller 154 (FIG. 1); a radio, e.g., radio 114 (FIG. 1) and/or radio 144 (FIG. 1); a transmitter, e.g., transmitter 118 and/or transmitter 148 (FIG. 1); a receiver, e.g., receiver 116, and/or receiver 146 (FIG. 1); a wireless charging power transmitter, e.g., wireless charging power transmitter 162 (FIG. 1); a wireless charging power receiver, e.g., wireless charging power receiver 126 (FIG. 1); and/or a message processor, e.g., message processor 128 (FIG. 1) and/or message processor 158 (FIG. 1).

As indicated at block 602, the method may include detecting a wireless charging of a mobile device by a wireless docking device. For example, controller 124 (FIG. 1) may detect the wireless charging of device 102 (FIG. 1) by wireless docking device 140 (FIG. 1), e.g., as described above.

As indicated at block 604, the method may include triggering a wireless docking session between the mobile device and the wireless docking device upon detection of the wireless charging. For example, controller 124 (FIG. 1) may trigger the wireless docking session between the mobile device 102 (FIG. 1) and the wireless docking device 140 (FIG. 1), for example, upon the detection of the wireless charging of mobile device 102 (FIG. 1), e.g., as described above.

As indicated at block 606, the method may include triggering a wireless charging power receiver of the mobile device to send to the docking device a mobile device identifier corresponding to the mobile device. For example, controller 124 (FIG. 1) may trigger wireless charging power receiver 126 (FIG. 1) to send to the docking device 140 (FIG. 1) the mobile device identifier corresponding to the mobile device 102 (FIG. 1), e.g., as described above.

As indicated at block 608, the method may include triggering a wireless communication transceiver of the mobile device to transmit to the docking device one or more discovery messages including a value, which is based on the mobile device identifier. For example, controller 124 (FIG. 1) may trigger radio 114 (FIG. 1) to send to the docking device 140 (FIG. 1) the one or more discovery messages including the first hash value, which is based on the mobile device identifier, e.g., as described above.

Figure 7:
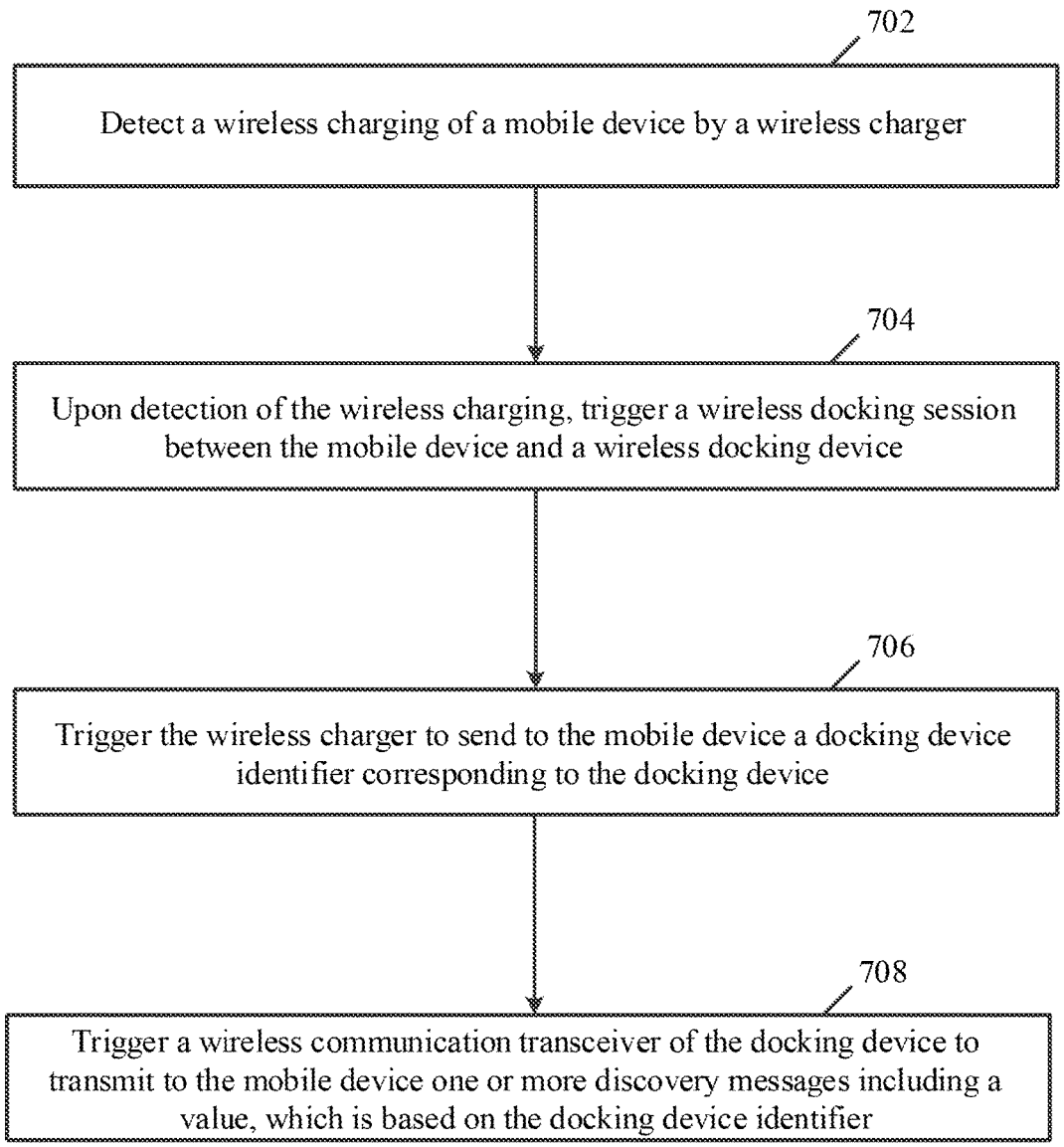
FIG. 7 is a schematic flow-chart illustration of a method triggering a wireless docking session between a mobile device and a wireless docking device, in accordance with some demonstrative embodiments.

Reference is made to FIG. 7, which schematically illustrates a method of triggering a wireless docking session between a mobile device and a wireless docking device, in accordance with some demonstrative embodiments. For example, one or more of the operations of the method of FIG. 7 may be performed by one or more elements of a system, e.g., system 100 (FIG. 1), for example, one or more wireless devices, e.g., mobile device 102 (FIG. 1) and/or docking device 140 (FIG. 1); a wireless charger, e.g., wireless charger 160 (FIG. 1); a controller, e.g., controller 124 (FIG. 1) and/or docking controller 154 (FIG. 1); a radio, e.g., radio 114 (FIG. 1) and/or radio 144 (FIG. 1); a transmitter, e.g., transmitter 118 and/or transmitter 148 (FIG. 1); a receiver, e.g., receiver 116, and/or receiver 146 (FIG. 1); a wireless charging power transmitter, e.g., wireless charging power transmitter 162 (FIG. 1); a wireless charging power receiver, e.g., wireless charging power receiver 126 (FIG. 1); and/or a message processor, e.g., message processor 128 (FIG. 1) and/or message processor 158 (FIG. 1).

As indicated at block 702, the method may include detecting a wireless charging of a mobile device by a wireless charger. For example, docking controller 154 (FIG. 1) may detect the wireless charging of device 102 (FIG. 1) by wireless charger 160 (FIG. 1), e.g., as described above.

As indicated at block 704, the method may include triggering a wireless docking session between the mobile device and the wireless docking device upon detection of the wireless charging. For example, docking controller 154 (FIG. 1) may trigger the wireless docking session between the mobile device 102 (FIG. 1) and the wireless docking device 140 (FIG. 1), for example, upon the detection of the wireless charging of mobile device 102 (FIG. 1), e.g., as described above.

As indicated at block 706, the method may include triggering the wireless charger to send to the mobile device a docking device identifier corresponding to the docking device. For example, docking controller 154 (FIG. 1) may trigger wireless charger 160 (FIG. 1) to send to the mobile device 102 (FIG. 1) the docking device identifier corresponding to the socking device 140 (FIG. 1), e.g., as described above.

As indicated at block 708, the method may include triggering a wireless communication transceiver of the docking device to transmit to the mobile device one or more discovery messages including a value, which is based on the docking device identifier. For example, docking controller 154 (FIG. 1) may trigger radio 144 (FIG. 1) to send to the mobile device 102 (FIG. 1) the one or more discovery messages including the second hash value based on the docking device identifier, e.g., as described above.

Figure 8:
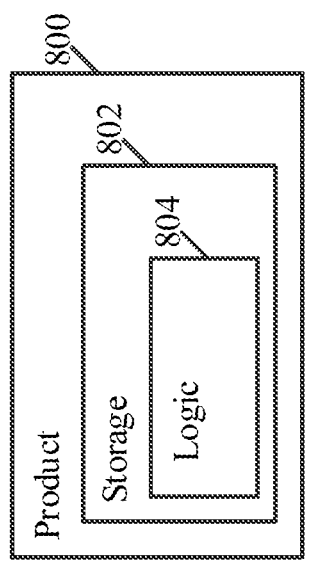
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include one or more tangible computer-readable non-transitory storage media 802, which may include computer-executable instructions, e.g., implemented by logic 804, operable to, when executed by at least one computer processor, enable the at least one computer processor to implement one or more operations at devices 102 and/or 140 (FIG. 1), transmitters 118 and/or 148 (FIG. 1), receivers 116 and/or 146 (FIG. 1), controllers 124 and/or 154 (FIG. 1), wireless charger 160 (FIG. 1), wireless charging power transmitter 162 (FIG. 1), wireless charging power receiver 126 (FIG. 1), and/or message processors 128 and/or 158 (FIG. 1), and/or to perform one or more operations described above with respect to FIGS. 1, 2, 3, 4, 5, 6, and/or 7, and/or one or more operations described herein. The phrase "non-transitory machine-readable medium" is directed to include all computer-readable media, with the sole exception being a transitory propagating signal.

In some demonstrative embodiments, product 800 and/or storage media 802 may include one or more types of computer-readable storage media capable of storing data, including volatile memory, non-volatile memory, removable or non-removable memory, erasable or non-erasable memory, writeable or re-writeable memory, and the like. For example, storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a mobile device to detect a wireless charging of the mobile device by a wireless docking device; and upon detection of the wireless charging, trigger a wireless docking session between the mobile device and the wireless docking device.

Example 2 includes the subject matter of Example 1, and optionally, wherein the apparatus is configured to cause the mobile device to detect the wireless charging based on an indication from a wireless charging power receiver of the mobile device, and to trigger the wireless docking session by triggering a wireless communication transceiver of the mobile device to establish the wireless docking session between the mobile device and the wireless docking device.

Example 3 includes the subject matter of Example 2, and optionally, wherein the apparatus is configured to cause the mobile device to, when the wireless communication transceiver is at a power save mode, switch the wireless transceiver to an active mode, upon the detection of the wireless charging.

Example 4 includes the subject matter of any one of Examples 1-3, and optionally, wherein the apparatus is configured to trigger a wireless charging power receiver of the mobile device to send to the docking device a mobile device identifier corresponding to the mobile device, and to trigger a wireless communication transceiver of the mobile device to transmit to the docking device one or more discovery messages comprising a value, which is based on the mobile device identifier.

Example 5 includes the subject matter of Example 4, and optionally, wherein the apparatus is configured to trigger the wireless communication transceiver to transmit to the docking device a first discovery message comprising a first hash value based on the mobile device identifier and a first predefined string, to process a second discovery message from the docking device comprising a second hash value based on the mobile device identifier and a second predefined string, and to associate with the docking device based on the second hash value.

Example 6 includes the subject matter of Example 5, and optionally, wherein the first discovery message comprises a probe request, and the second discovery message comprises a probe response in response to the probe request.

Example 7 includes the subject matter of Example 5, and optionally, wherein the second discovery message comprises a probe request, and the first discovery message comprises a probe response in response to the probe request.

Example 8 includes the subject matter of any one of Examples 4-7, and optionally, wherein the mobile device identifier comprises a Personal Identification Number (PIN).

Example 9 includes the subject matter of any one of Examples 4-8, and optionally, wherein the apparatus is configured to cause the mobile device to trigger the wireless communication transceiver to establish a secure connection between the mobile device and the wireless docking device according to a Wi-Fi Protected Setup Personal Identification Number (WPS-PIN) protocol using the mobile device identifier.

Example 10 includes the subject matter of any one of Examples 4-9, and optionally, wherein the apparatus is configured to trigger the wireless charging power receiver to send the mobile device identifier to the wireless docking device by applying a load modulation to the wireless charging.

Example 11 includes the subject matter of any one of Examples 1-3, and optionally, wherein the apparatus is configured to process a docking device identifier received by a wireless charging power receiver of the mobile device from the wireless docking device, and to trigger a wireless communication transceiver of the mobile device to transmit to the wireless docking device one or more discovery messages comprising a value, which is based on the docking device identifier.

Example 12 includes the subject matter of Example 11, and optionally, wherein the apparatus is configured to trigger the wireless communication transceiver to transmit to the docking device a first discovery message comprising a first hash value based on the docking device identifier and a first predefined string, to process a second discovery message from the docking device comprising a second hash value based on the docking device identifier and a second predefined string, and to associate with the docking device based on the second hash value.

Example 13 includes the subject matter of Example 12, and optionally, wherein the first discovery message comprises a probe request, and the second discovery message comprises a probe response in response to the probe request.

Example 14 includes the subject matter of Example 12, and optionally, wherein the second discovery message comprises a probe request, and the first discovery message comprises a probe response in response to the probe request.

Example 15 includes the subject matter of any one of Examples 11-14, and optionally, wherein the docking device identifier comprises a Personal Identification Number (PIN).

Example 16 includes the subject matter of any one of Examples 11-15, and optionally, wherein the apparatus is configured to trigger the wireless communication transceiver to establish a secure connection between the mobile device and the wireless docking device according to a Wi-Fi Protected Setup Personal Identification Number (WPS-PIN) protocol using the docking device identifier.

Example 17 includes the subject matter of any one of Examples 11-16, and optionally, wherein the apparatus is configured to trigger the wireless charging power receiver to process the docking device identifier by demodulating wireless power signals from the docking device.

Example 18 includes the subject matter of any one of Examples 1-17, and optionally, wherein the apparatus is configured to trigger the mobile device to, upon detection of the wireless charging, establish a secure session between the mobile device and the wireless docking device based on one or more security keys of a previous secure session between the mobile device and the wireless docking device.

Example 19 includes the subject matter of any one of Examples 1-18, and optionally, comprising a wireless charging power receiver to receive wireless power signals, and a wireless communication transceiver to establish the wireless docking session between the mobile device and the wireless docking device.

Example 20 includes the subject matter of any one of Examples 1-19, and optionally, comprising a memory, a processor, and one or more antennas.

Example 21 includes a system of wireless communication comprising a mobile device, the mobile device comprising one or more antennas; a radio; a memory; a processor; and a controller configured to cause the mobile device to detect a wireless charging of the mobile device by a wireless docking device; and upon detection of the wireless charging, trigger a wireless docking session between the mobile device and the wireless docking device.

Example 22 includes the subject matter of Example 21, and optionally, wherein the controller is configured to cause the mobile device to detect the wireless charging based on an indication from a wireless charging power receiver of the mobile device, and to trigger the wireless docking session by triggering a wireless communication transceiver of the mobile device to establish the wireless docking session between the mobile device and the wireless docking device.

Example 23 includes the subject matter of Example 22, and optionally, wherein the controller is configured to cause the mobile device to, when the wireless communication transceiver is at a power save mode, switch the wireless transceiver to an active mode, upon the detection of the wireless charging.

Example 24 includes the subject matter of any one of Examples 21-23, and optionally, wherein the controller is configured to trigger a wireless charging power receiver of the mobile device to send to the docking device a mobile device identifier corresponding to the mobile device, and to trigger a wireless communication transceiver of the mobile device to transmit to the docking device one or more discovery messages comprising a value, which is based on the mobile device identifier.

Example 25 includes the subject matter of Example 24, and optionally, wherein the controller is configured to trigger the wireless communication transceiver to transmit to the docking device a first discovery message comprising a first hash value based on the mobile device identifier and a first predefined string, to process a second discovery message from the docking device comprising a second hash value based on the mobile device identifier and a second predefined string, and to associate with the docking device based on the second hash value.

Example 26 includes the subject matter of Example 25, and optionally, wherein the first discovery message comprises a probe request, and the second discovery message comprises a probe response in response to the probe request.

Example 27 includes the subject matter of Example 25, and optionally, wherein the second discovery message comprises a probe request, and the first discovery message comprises a probe response in response to the probe request.

Example 28 includes the subject matter of any one of Examples 24-27, and optionally, wherein the mobile device identifier comprises a Personal Identification Number (PIN).

Example 29 includes the subject matter of any one of Examples 24-28, and optionally, wherein the controller is configured to cause the mobile device to trigger the wireless communication transceiver to establish a secure connection between the mobile device and the wireless docking device according to a Wi-Fi Protected Setup Personal Identification Number (WPS-PIN) protocol using the mobile device identifier.

Example 30 includes the subject matter of any one of Examples 24-29, and optionally, wherein the controller is configured to trigger the wireless charging power receiver to send the mobile device identifier to the wireless docking device by applying a load modulation to the wireless charging.

Example 31 includes the subject matter of any one of Examples 21-23, and optionally, wherein the controller is configured to process a docking device identifier received by a wireless charging power receiver of the mobile device from the wireless docking device, and to trigger a wireless communication transceiver of the mobile device to transmit to the wireless docking device one or more discovery messages comprising a value, which is based on the docking device identifier.

Example 32 includes the subject matter of Example 31, and optionally, wherein the controller is configured to trigger the wireless communication transceiver to transmit to the docking device a first discovery message comprising a first hash value based on the docking device identifier and a first predefined string, to process a second discovery message from the docking device comprising a second hash value based on the docking device identifier and a second predefined string, and to associate with the docking device based on the second hash value.

Example 33 includes the subject matter of Example 32, and optionally, wherein the first discovery message comprises a probe request, and the second discovery message comprises a probe response in response to the probe request.

Example 34 includes the subject matter of Example 32, and optionally, wherein the second discovery message comprises a probe request, and the first discovery message comprises a probe response in response to the probe request.

Example 35 includes the subject matter of any one of Examples 31-34, and optionally, wherein the docking device identifier comprises a Personal Identification Number (PIN).

Example 36 includes the subject matter of any one of Examples 31-35, and optionally, wherein the controller is configured to trigger the wireless communication transceiver to establish a secure connection between the mobile device and the wireless docking device according to a Wi-Fi Protected Setup Personal Identification Number (WPS-PIN) protocol using the docking device identifier.

Example 37 includes the subject matter of any one of Examples 31-36, and optionally, wherein the controller is configured to trigger the wireless charging power receiver to process the docking device identifier by demodulating wireless power signals from the docking device.

Example 38 includes the subject matter of any one of Examples 21-37, and optionally, wherein the controller is configured to trigger the mobile device to, upon detection of the wireless charging, establish a secure session between the mobile device and the wireless docking device based on one or more security keys of a previous secure session between the mobile device and the wireless docking device.

Example 39 includes the subject matter of any one of Examples 21-38, and optionally, wherein the mobile device comprises a wireless charging power receiver to receive wireless power signals, and a wireless communication transceiver to establish the wireless docking session between the mobile device and the wireless docking device.

Example 40 includes a method to be performed at a mobile device, the method comprising detecting a wireless charging of the mobile device by a wireless docking device; and upon detection of the wireless charging, triggering a wireless docking session between the mobile device and the wireless docking device.

Example 41 includes the subject matter of Example 40, and optionally, comprising detecting the wireless charging based on an indication from a wireless charging power receiver of the mobile device, and triggering the wireless docking session by triggering a wireless communication transceiver of the mobile device to establish the wireless docking session between the mobile device and the wireless docking device.

Example 42 includes the subject matter of Example 41, and optionally, comprising, when the wireless communication transceiver is at a power save mode, switching the wireless transceiver to an active mode, upon the detection of the wireless charging.

Example 43 includes the subject matter of any one of Examples 40-42, and optionally, comprising triggering a wireless charging power receiver of the mobile device to send to the docking device a mobile device identifier corresponding to the mobile device, and triggering a wireless communication transceiver of the mobile device to transmit to the docking device one or more discovery messages comprising a value, which is based on the mobile device identifier.

Example 44 includes the subject matter of Example 43, and optionally, comprising transmitting to the docking device a first discovery message comprising a first hash value based on the mobile device identifier and a first predefined string, processing a second discovery message from the docking device comprising a second hash value based on the mobile device identifier and a second predefined string, and associating with the docking device based on the second hash value.

Example 45 includes the subject matter of Example 44, and optionally, wherein the first discovery message comprises a probe request, and the second discovery message comprises a probe response in response to the probe request.

Example 46 includes the subject matter of Example 44, and optionally, wherein the second discovery message comprises a probe request, and the first discovery message comprises a probe response in response to the probe request.

Example 47 includes the subject matter of any one of Examples 43-46, and optionally, wherein the mobile device identifier comprises a Personal Identification Number (PIN).

Example 48 includes the subject matter of any one of Examples 43-47, and optionally, comprising triggering the wireless communication transceiver to establish a secure connection between the mobile device and the wireless docking device according to a Wi-Fi Protected Setup Personal Identification Number (WPS-PIN) protocol using the mobile device identifier.

Example 49 includes the subject matter of any one of Examples 43-48, and optionally, comprising triggering the wireless charging power receiver to send the mobile device identifier to the wireless docking device by applying a load modulation to the wireless charging.

Example 50 includes the subject matter of any one of Examples 40-42, and optionally, comprising processing a docking device identifier received by a wireless charging power receiver of the mobile device from the wireless docking device, and triggering a wireless communication transceiver of the mobile device to transmit to the wireless docking device one or more discovery messages comprising a value, which is based on the docking device identifier.

Example 51 includes the subject matter of Example 50, and optionally, comprising transmitting to the docking device a first discovery message comprising a first hash value based on the docking device identifier and a first predefined string, processing a second discovery message from the docking device comprising a second hash value based on the docking device identifier and a second predefined string, and associating with the docking device based on the second hash value.

Example 52 includes the subject matter of Example 51, and optionally, wherein the first discovery message comprises a probe request, and the second discovery message comprises a probe response in response to the probe request.

Example 53 includes the subject matter of Example 51, and optionally, wherein the second discovery message comprises a probe request, and the first discovery message comprises a probe response in response to the probe request.

Example 54 includes the subject matter of any one of Examples 50-53, and optionally, wherein the docking device identifier comprises a Personal Identification Number (PIN).

Example 55 includes the subject matter of any one of Examples 50-54, and optionally, comprising triggering the wireless communication transceiver to establish a secure connection between the mobile device and the wireless docking device according to a Wi-Fi Protected Setup Personal Identification Number (WPS-PIN) protocol using the docking device identifier.

Example 56 includes the subject matter of any one of Examples 50-55, and optionally, comprising triggering the wireless charging power receiver to process the docking device identifier by demodulating wireless power signals from the docking device.

Example 57 includes the subject matter of any one of Examples 40-56, and optionally, comprising, upon detection of the wireless charging, establishing a secure session between the mobile device and the wireless docking device based on one or more security keys of a previous secure session between the mobile device and the wireless docking device.

Example 58 includes a product comprising one or more tangible computer-readable non-transitory storage media comprising computer-executable instructions operable to, when executed by at least one computer processor, enable the at least one computer processor to implement operations at a mobile device, the operations comprising detecting a wireless charging of the mobile device by a wireless docking device; and upon detection of the wireless charging, triggering a wireless docking session between the mobile device and the wireless docking device.

Example 59 includes the subject matter of Example 58, and optionally, wherein the operations comprise detecting the wireless charging based on an indication from a wireless charging power receiver of the mobile device, and triggering the wireless docking session by triggering a wireless communication transceiver of the mobile device to establish the wireless docking session between the mobile device and the wireless docking device.

Example 60 includes the subject matter of Example 59, and optionally, wherein the operations comprise, when the wireless communication transceiver is at a power save mode, switching the wireless transceiver to an active mode, upon the detection of the wireless charging.

Example 61 includes the subject matter of any one of Examples 58-60, and optionally, wherein the operations comprise triggering a wireless charging power receiver of the mobile device to send to the docking device a mobile device identifier corresponding to the mobile device, and triggering a wireless communication transceiver of the mobile device to transmit to the docking device one or more discovery messages comprising a value, which is based on the mobile device identifier.

Example 62 includes the subject matter of Example 61, and optionally, wherein the operations comprise transmitting to the docking device a first discovery message comprising a first hash value based on the mobile device identifier and a first predefined string, processing a second discovery message from the docking device comprising a second hash value based on the mobile device identifier and a second predefined string, and associating with the docking device based on the second hash value.

Example 63 includes the subject matter of Example 62, and optionally, wherein the first discovery message comprises a probe request, and the second discovery message comprises a probe response in response to the probe request.

Example 64 includes the subject matter of Example 62, and optionally, wherein the second discovery message comprises a probe request, and the first discovery message comprises a probe response in response to the probe request.

Example 65 includes the subject matter of any one of Examples 61-64, and optionally, wherein the mobile device identifier comprises a Personal Identification Number (PIN).

Example 66 includes the subject matter of any one of Examples 61-65, and optionally, wherein the operations comprise triggering the wireless communication transceiver to establish a secure connection between the mobile device and the wireless docking device according to a Wi-Fi Protected Setup Personal Identification Number (WPS-PIN) protocol using the mobile device identifier.

Example 67 includes the subject matter of any one of Examples 61-66, and optionally, wherein the operations comprise triggering the wireless charging power receiver to send the mobile device identifier to the wireless docking device by applying a load modulation to the wireless charging.

Example 68 includes the subject matter of any one of Examples 58-60, and optionally, wherein the operations comprise processing a docking device identifier received by a wireless charging power receiver of the mobile device from the wireless docking device, and triggering a wireless communication transceiver of the mobile device to transmit to the wireless docking device one or more discovery messages comprising a value, which is based on the docking device identifier.

Example 69 includes the subject matter of Example 68, and optionally, wherein the operations comprise transmitting to the docking device a first discovery message comprising a first hash value based on the docking device identifier and a first predefined string, processing a second discovery message from the docking device comprising a second hash value based on the docking device identifier and a second predefined string, and associating with the docking device based on the second hash value.

Example 70 includes the subject matter of Example 69, and optionally, wherein the first discovery message comprises a probe request, and the second discovery message comprises a probe response in response to the probe request.

Example 71 includes the subject matter of Example 69, and optionally, wherein the second discovery message comprises a probe request, and the first discovery message comprises a probe response in response to the probe request.

Example 72 includes the subject matter of any one of Examples 68-71, and optionally, wherein the docking device identifier comprises a Personal Identification Number (PIN).

Example 73 includes the subject matter of any one of Examples 68-72, and optionally, wherein the operations comprise triggering the wireless communication transceiver to establish a secure connection between the mobile device and the wireless docking device according to a Wi-Fi Protected Setup Personal Identification Number (WPS-PIN) protocol using the docking device identifier.

Example 74 includes the subject matter of any one of Examples 68-73, and optionally, wherein the operations comprise triggering the wireless charging power receiver to process the docking device identifier by demodulating wireless power signals from the docking device.

Example 75 includes the subject matter of any one of Examples 58-74, and optionally, wherein the operations comprise, upon detection of the wireless charging, establishing a secure session between the mobile device and the wireless docking device based on one or more security keys of a previous secure session between the mobile device and the wireless docking device.

Example 76 includes an apparatus of wireless communication by a mobile device, the apparatus comprising means for detecting a wireless charging of the mobile device by a wireless docking device; and means for, upon detection of the wireless charging, triggering a wireless docking session between the mobile device and the wireless docking device.

Example 77 includes the subject matter of Example 76, and optionally, comprising means for detecting the wireless charging based on an indication from a wireless charging power receiver of the mobile device, and triggering the wireless docking session by triggering a wireless communication transceiver of the mobile device to establish the wireless docking session between the mobile device and the wireless docking device.

Example 78 includes the subject matter of Example 77, and optionally, comprising means for, when the wireless communication transceiver is at a power save mode, switching the wireless transceiver to an active mode, upon the detection of the wireless charging.

Example 79 includes the subject matter of any one of Examples 76-78, and optionally, comprising means for triggering a wireless charging power receiver of the mobile device to send to the docking device a mobile device identifier corresponding to the mobile device, and triggering a wireless communication transceiver of the mobile device to transmit to the docking device one or more discovery messages comprising a value, which is based on the mobile device identifier.

Example 80 includes the subject matter of Example 79, and optionally, comprising means for transmitting to the docking device a first discovery message comprising a first hash value based on the mobile device identifier and a first predefined string, processing a second discovery message from the docking device comprising a second hash value based on the mobile device identifier and a second predefined string, and associating with the docking device based on the second hash value.

Example 81 includes the subject matter of Example 80, and optionally, wherein the first discovery message comprises a probe request, and the second discovery message comprises a probe response in response to the probe request.

Example 82 includes the subject matter of Example 80, and optionally, wherein the second discovery message comprises a probe request, and the first discovery message comprises a probe response in response to the probe request.

Example 83 includes the subject matter of any one of Examples 79-82, and optionally, wherein the mobile device identifier comprises a Personal Identification Number (PIN).

Example 84 includes the subject matter of any one of Examples 79-83, and optionally, comprising means for triggering the wireless communication transceiver to establish a secure connection between the mobile device and the wireless docking device according to a Wi-Fi Protected Setup Personal Identification Number (WPS-PIN) protocol using the mobile device identifier.

Example 85 includes the subject matter of any one of Examples 79-84, and optionally, comprising means for triggering the wireless charging power receiver to send the mobile device identifier to the wireless docking device by applying a load modulation to the wireless charging.

Example 86 includes the subject matter of any one of Examples 76-78, and optionally, comprising means for processing a docking device identifier received by a wireless charging power receiver of the mobile device from the wireless docking device, and triggering a wireless communication transceiver of the mobile device to transmit to the wireless docking device one or more discovery messages comprising a value, which is based on the docking device identifier.

Example 87 includes the subject matter of Example 86, and optionally, comprising means for transmitting to the docking device a first discovery message comprising a first hash value based on the docking device identifier and a first predefined string, processing a second discovery message from the docking device comprising a second hash value based on the docking device identifier and a second predefined string, and associating with the docking device based on the second hash value.

Example 88 includes the subject matter of Example 87, and optionally, wherein the first discovery message comprises a probe request, and the second discovery message comprises a probe response in response to the probe request.

Example 89 includes the subject matter of Example 87, and optionally, wherein the second discovery message comprises a probe request, and the first discovery message comprises a probe response in response to the probe request.

Example 90 includes the subject matter of any one of Examples 86-89, and optionally, wherein the docking device identifier comprises a Personal Identification Number (PIN).

Example 91 includes the subject matter of any one of Examples 86-90, and optionally, comprising means for triggering the wireless communication transceiver to establish a secure connection between the mobile device and the wireless docking device according to a Wi-Fi Protected Setup Personal Identification Number (WPS-PIN) protocol using the docking device identifier.

Example 92 includes the subject matter of any one of Examples 86-91, and optionally, comprising means for triggering the wireless charging power receiver to process the docking device identifier by demodulating wireless power signals from the docking device.

Example 93 includes the subject matter of any one of Examples 76-92, and optionally, comprising means for, upon detection of the wireless charging, establishing a secure session between the mobile device and the wireless docking device based on one or more security keys of a previous secure session between the mobile device and the wireless docking device.

Example 94 includes an apparatus comprising circuitry and logic configured to cause a wireless docking device to detect a wireless charging of a mobile device by a wireless charger; and upon detection of the wireless charging, trigger a wireless docking session between the mobile device and the wireless docking device.

Example 95 includes the subject matter of Example 94, and optionally, wherein the apparatus is configured to cause the wireless docking device to detect the wireless charging based on an indication from the wireless charger, and to trigger the wireless docking session by triggering a wireless communication transceiver of the wireless docking device to establish the wireless docking session between the mobile device and the wireless docking device.

Example 96 includes the subject matter of Example 95, and optionally, wherein the apparatus is configured to cause the wireless docking device to, when the wireless communication transceiver is at a power save mode, switch the wireless communication transceiver to an active mode, upon the detection of the wireless charging.

Example 97 includes the subject matter of any one of Examples 94-96, and optionally, wherein the apparatus is configured to trigger the wireless charger to send to the mobile device a docking device identifier corresponding to the wireless docking device, and to trigger a wireless communication transceiver of the wireless docking device to transmit to the mobile device one or more discovery messages comprising a value, which is based on the docking device identifier.

Example 98 includes the subject matter of Example 97, and optionally, wherein the apparatus is configured to trigger the wireless communication transceiver to transmit to the mobile device a first discovery message comprising a first hash value based on the docking device identifier and a first predefined string, to process a second discovery message from the mobile device comprising a second hash value based on the docking device identifier and a second predefined string, and to associate with the mobile device based on the second hash value.

Example 99 includes the subject matter of Example 98, and optionally, wherein the first discovery message comprises a probe request, and the second discovery message comprises a probe response in response to the probe request.

Example 100 includes the subject matter of Example 98, and optionally, wherein the second discovery message comprises a probe request, and the first discovery message comprises a probe response in response to the probe request.

Example 101 includes the subject matter of any one of Examples 97-100, and optionally, wherein the docking device identifier comprises a Personal Identification Number (PIN).

Example 102 includes the subject matter of any one of Examples 97-101, and optionally, wherein the apparatus is configured to cause the wireless docking device to trigger the wireless communication transceiver to establish a secure connection between the mobile device and the wireless docking device according to a Wi-Fi Protected Setup Personal Identification Number (WPS-PIN) protocol using the docking device identifier.

Example 103 includes the subject matter of any one of Examples 97-102, and optionally, wherein the apparatus is configured to trigger the wireless charger to send the docking device identifier to the mobile device by modulating wireless power signals.

Example 104 includes the subject matter of any one of Examples 94-96, and optionally, wherein the apparatus is configured to process a mobile device identifier from the wireless charger, and to trigger a wireless communication transceiver of the wireless docking device to transmit to the mobile device one or more discovery messages comprising a value, which is based on the mobile device identifier.

Example 105 includes the subject matter of Example 104, and optionally, wherein the apparatus is configured to trigger the wireless communication transceiver to transmit to the mobile device a first discovery message comprising a first hash value based on the mobile device identifier and a first predefined string, to process a second discovery message from the mobile device comprising a second hash value based on the mobile device identifier and a second predefined string, and to associate with the mobile device based on the second hash value.

Example 106 includes the subject matter of Example 105, and optionally, wherein the first discovery message comprises a probe request, and the second discovery message comprises a probe response in response to the probe request.

Example 107 includes the subject matter of Example 105, and optionally, wherein the second discovery message comprises a probe request, and the first discovery message comprises a probe response in response to the probe request.

Example 108 includes the subject matter of any one of Examples 104-107, and optionally, wherein the mobile device identifier comprises a Personal Identification Number (PIN).

Example 109 includes the subject matter of any one of Examples 104-108, and optionally, wherein the apparatus is configured to trigger the wireless communication transceiver to establish a secure connection between the mobile device and the wireless docking device according to a Wi-Fi Protected Setup Personal Identification Number (WPS-PIN) protocol using the mobile device identifier.

Example 110 includes the subject matter of any one of Examples 104-109, and optionally, wherein the apparatus is configured to trigger the wireless charger to process receipt of the mobile device identifier from the mobile device.

Example 111 includes the subject matter of any one of Examples 94-110, and optionally, wherein the apparatus is configured to trigger the mobile device to, upon detection of the wireless charging, establish a secure session between the mobile device and the wireless docking device based on one or more security keys of a previous secure session between the mobile device and the wireless docking device.

Example 112 includes the subject matter of any one of Examples 94-111, and optionally, comprising the wireless charger.

Example 113 includes the subject matter of any one of Examples 94-112, and optionally, comprising a charger interface to interface with the wireless charger.

Example 114 includes the subject matter of any one of Examples 94-113, and optionally, comprising a memory, a processor, and one or more antennas.

Example 115 includes a system of wireless communication comprising a wireless docking device, the wireless docking device comprising one or more antennas; a radio; a memory; a processor; and a controller configured to cause the wireless docking device to detect a wireless charging of a mobile device by a wireless charger; and upon detection of the wireless charging, trigger a wireless docking session between the mobile device and the wireless docking device.

Example 116 includes the subject matter of Example 115, and optionally, wherein the controller is configured to cause the wireless docking device to detect the wireless charging based on an indication from the wireless charger, and to trigger the wireless docking session by triggering a wireless communication transceiver of the wireless docking device to establish the wireless docking session between the mobile device and the wireless docking device.

Example 117 includes the subject matter of Example 116, and optionally, wherein the controller is configured to cause the wireless docking device to, when the wireless communication transceiver is at a power save mode, switch the wireless communication transceiver to an active mode, upon the detection of the wireless charging.

Example 118 includes the subject matter of any one of Examples 115-117, and optionally, wherein the controller is configured to trigger the wireless charger to send to the mobile device a docking device identifier corresponding to the wireless docking device, and to trigger a wireless communication transceiver of the wireless docking device to transmit to the mobile device one or more discovery messages comprising a value, which is based on the docking device identifier.

Example 119 includes the subject matter of Example 118, and optionally, wherein the controller is configured to trigger the wireless communication transceiver to transmit to the mobile device a first discovery message comprising a first hash value based on the docking device identifier and a first predefined string, to process a second discovery message from the mobile device comprising a second hash value based on the docking device identifier and a second predefined string, and to associate with the mobile device based on the second hash value.

Example 120 includes the subject matter of Example 119, and optionally, wherein the first discovery message comprises a probe request, and the second discovery message comprises a probe response in response to the probe request.

Example 121 includes the subject matter of Example 119, and optionally, wherein the second discovery message comprises a probe request, and the first discovery message comprises a probe response in response to the probe request.

Example 122 includes the subject matter of any one of Examples 118-121, and optionally, wherein the docking device identifier comprises a Personal Identification Number (PIN).

Example 123 includes the subject matter of any one of Examples 118-122, and optionally, wherein the controller is configured to cause the wireless docking device to trigger the wireless communication transceiver to establish a secure connection between the mobile device and the wireless docking device according to a Wi-Fi Protected Setup Personal Identification Number (WPS-PIN) protocol using the docking device identifier.

Example 124 includes the subject matter of any one of Examples 118-123, and optionally, wherein the controller is configured to trigger the wireless charger to send the docking device identifier to the mobile device by modulating wireless power signals.

Example 125 includes the subject matter of any one of Examples 115-117, and optionally, wherein the controller is configured to process a mobile device identifier from the wireless charger, and to trigger a wireless communication transceiver of the wireless docking device to transmit to the mobile device one or more discovery messages comprising a value, which is based on the mobile device identifier.

Example 126 includes the subject matter of Example 125, and optionally, wherein the controller is configured to trigger the wireless communication transceiver to transmit to the mobile device a first discovery message comprising a first hash value based on the mobile device identifier and a first predefined string, to process a second discovery message from the mobile device comprising a second hash value based on the mobile device identifier and a second predefined string, and to associate with the mobile device based on the second hash value.

Example 127 includes the subject matter of Example 126, and optionally, wherein the first discovery message comprises a probe request, and the second discovery message comprises a probe response in response to the probe request.

Example 128 includes the subject matter of Example 126, and optionally, wherein the second discovery message comprises a probe request, and the first discovery message comprises a probe response in response to the probe request.

Example 129 includes the subject matter of any one of Examples 125-128, and optionally, wherein the mobile device identifier comprises a Personal Identification Number (PIN).

Example 130 includes the subject matter of any one of Examples 125-129, and optionally, wherein the controller is configured to trigger the wireless communication transceiver to establish a secure connection between the mobile device and the wireless docking device according to a Wi-Fi Protected Setup Personal Identification Number (WPS-PIN) protocol using the mobile device identifier.

Example 131 includes the subject matter of any one of Examples 125-130, and optionally, wherein the controller is configured to trigger the wireless charger to process receipt of the mobile device identifier from the mobile device.

Example 132 includes the subject matter of any one of Examples 115-131, and optionally, wherein the controller is configured to trigger the mobile device to, upon detection of the wireless charging, establish a secure session between the mobile device and the wireless docking device based on one or more security keys of a previous secure session between the mobile device and the wireless docking device.

Example 133 includes the subject matter of any one of Examples 115-132, and optionally, wherein the wireless docking device comprises the wireless charger.

Example 134 includes the subject matter of any one of Examples 115-133, wherein the wireless docking device comprises a charger interface to interface with the wireless charger.

Example 135 includes a method to be performed at a wireless docking device, the method comprising detecting a wireless charging of a mobile device by a wireless charger; and upon detection of the wireless charging, triggering a wireless docking session between the mobile device and the wireless docking device.

Example 136 includes the subject matter of Example 135, and optionally, comprising detecting the wireless charging based on an indication from the wireless charger, and triggering the wireless docking session by triggering a wireless communication transceiver of the wireless docking device to establish the wireless docking session between the mobile device and the wireless docking device.

Example 137 includes the subject matter of Example 136, and optionally, comprising, when the wireless communication transceiver is at a power save mode, switching the wireless communication transceiver to an active mode, upon the detection of the wireless charging.

Example 138 includes the subject matter of any one of Examples 135-137, and optionally, comprising triggering the wireless charger to send to the mobile device a docking device identifier corresponding to the wireless docking device, and triggering a wireless communication transceiver of the wireless docking device to transmit to the mobile device one or more discovery messages comprising a value, which is based on the docking device identifier.

Example 139 includes the subject matter of Example 138, and optionally, comprising transmitting to the mobile device a first discovery message comprising a first hash value based on the docking device identifier and a first predefined string, processing a second discovery message from the mobile device comprising a second hash value based on the docking device identifier and a second predefined string, and associating with the mobile device based on the second hash value.

Example 140 includes the subject matter of Example 139, and optionally, wherein the first discovery message comprises a probe request, and the second discovery message comprises a probe response in response to the probe request.

Example 141 includes the subject matter of Example 139, and optionally, wherein the second discovery message comprises a probe request, and the first discovery message comprises a probe response in response to the probe request.

Example 142 includes the subject matter of any one of Examples 138-141, and optionally, wherein the docking device identifier comprises a Personal Identification Number (PIN).

Example 143 includes the subject matter of any one of Examples 138-142, and optionally, comprising triggering the wireless communication transceiver to establish a secure connection between the mobile device and the wireless docking device according to a Wi-Fi Protected Setup Personal Identification Number (WPS-PIN) protocol using the docking device identifier.

Example 144 includes the subject matter of any one of Examples 138-143, and optionally, comprising triggering the wireless charger to send the docking device identifier to the mobile device by modulating wireless power signals.

Example 145 includes the subject matter of any one of Examples 135-137, and optionally, comprising processing a mobile device identifier from the wireless charger, and triggering a wireless communication transceiver of the wireless docking device to transmit to the mobile device one or more discovery messages comprising a value, which is based on the mobile device identifier.

Example 146 includes the subject matter of Example 145, and optionally, comprising transmitting to the mobile device a first discovery message comprising a first hash value based on the mobile device identifier and a first predefined string, processing a second discovery message from the mobile device comprising a second hash value based on the mobile device identifier and a second predefined string, and associating with the mobile device based on the second hash value.

Example 147 includes the subject matter of Example 146, and optionally, wherein the first discovery message comprises a probe request, and the second discovery message comprises a probe response in response to the probe request.

Example 148 includes the subject matter of Example 146, and optionally, wherein the second discovery message comprises a probe request, and the first discovery message comprises a probe response in response to the probe request.

Example 149 includes the subject matter of any one of Examples 145-148, and optionally, wherein the mobile device identifier comprises a Personal Identification Number (PIN).

Example 150 includes the subject matter of any one of Examples 145-149, and optionally, comprising triggering the wireless communication transceiver to establish a secure connection between the mobile device and the wireless docking device according to a Wi-Fi Protected Setup Personal Identification Number (WPS-PIN) protocol using the mobile device identifier.

Example 151 includes the subject matter of any one of Examples 145-150, and optionally, comprising triggering the wireless charger to process receipt of the mobile device identifier from the mobile device.

Example 152 includes the subject matter of any one of Examples 135-151, and optionally, comprising, upon detection of the wireless charging, establishing a secure session between the mobile device and the wireless docking device based on one or more security keys of a previous secure session between the mobile device and the wireless docking device.

Example 153 includes a product comprising one or more tangible computer-readable non-transitory storage media comprising computer-executable instructions operable to, when executed by at least one computer processor, enable the at least one computer processor to implement operations at a wireless docking device, the operations comprising detecting a wireless charging of a mobile device by a wireless charger; and upon detection of the wireless charging, triggering a wireless docking session between the mobile device and the wireless docking device.

Example 154 includes the subject matter of Example 153, and optionally, wherein the operations comprise detecting the wireless charging based on an indication from the wireless charger, and triggering the wireless docking session by triggering a wireless communication transceiver of the wireless docking device to establish the wireless docking session between the mobile device and the wireless docking device.

Example 155 includes the subject matter of Example 154, and optionally, wherein the operations comprise, when the wireless communication transceiver is at a power save mode, switching the wireless communication transceiver to an active mode, upon the detection of the wireless charging.

Example 156 includes the subject matter of any one of Examples 153-155, and optionally, wherein the operations comprise triggering the wireless charger to send to the mobile device a docking device identifier corresponding to the wireless docking device, and triggering a wireless communication transceiver of the wireless docking device to transmit to the mobile device one or more discovery messages comprising a value, which is based on the docking device identifier.

Example 157 includes the subject matter of Example 156, and optionally, wherein the operations comprise transmitting to the mobile device a first discovery message comprising a first hash value based on the docking device identifier and a first predefined string, processing a second discovery message from the mobile device comprising a second hash value based on the docking device identifier and a second predefined string, and associating with the mobile device based on the second hash value.

Example 158 includes the subject matter of Example 157, and optionally, wherein the first discovery message comprises a probe request, and the second discovery message comprises a probe response in response to the probe request.

Example 159 includes the subject matter of Example 157, and optionally, wherein the second discovery message comprises a probe request, and the first discovery message comprises a probe response in response to the probe request.

Example 160 includes the subject matter of any one of Examples 156-159, and optionally, wherein the docking device identifier comprises a Personal Identification Number (PIN).

Example 161 includes the subject matter of any one of Examples 156-160, and optionally, wherein the operations comprise triggering the wireless communication transceiver to establish a secure connection between the mobile device and the wireless docking device according to a Wi-Fi Protected Setup Personal Identification Number (WPS-PIN) protocol using the docking device identifier.

Example 162 includes the subject matter of any one of Examples 156-161, and optionally, wherein the operations comprise triggering the wireless charger to send the docking device identifier to the mobile device by modulating wireless power signals.

Example 163 includes the subject matter of any one of Examples 153-155, and optionally, wherein the operations comprise processing a mobile device identifier from the wireless charger, and triggering a wireless communication transceiver of the wireless docking device to transmit to the mobile device one or more discovery messages comprising a value, which is based on the mobile device identifier.

Example 164 includes the subject matter of Example 163, and optionally, wherein the operations comprise transmitting to the mobile device a first discovery message comprising a first hash value based on the mobile device identifier and a first predefined string, processing a second discovery message from the mobile device comprising a second hash value based on the mobile device identifier and a second predefined string, and associating with the mobile device based on the second hash value.

Example 165 includes the subject matter of Example 164, and optionally, wherein the first discovery message comprises a probe request, and the second discovery message comprises a probe response in response to the probe request.

Example 166 includes the subject matter of Example 164, and optionally, wherein the second discovery message comprises a probe request, and the first discovery message comprises a probe response in response to the probe request.

Example 167 includes the subject matter of any one of Examples 163-166, and optionally, wherein the mobile device identifier comprises a Personal Identification Number (PIN).

Example 168 includes the subject matter of any one of Examples 163-167, and optionally, wherein the operations comprise triggering the wireless communication transceiver to establish a secure connection between the mobile device and the wireless docking device according to a Wi-Fi Protected Setup Personal Identification Number (WPS-PIN) protocol using the mobile device identifier.

Example 169 includes the subject matter of any one of Examples 163-168, and optionally, wherein the operations comprise triggering the wireless charger to process receipt of the mobile device identifier from the mobile device.

Example 170 includes the subject matter of any one of Examples 153-169, and optionally, wherein the operations comprise, upon detection of the wireless charging, establishing a secure session between the mobile device and the wireless docking device based on one or more security keys of a previous secure session between the mobile device and the wireless docking device.

Example 171 includes an apparatus of wireless communication by a wireless docking device, the apparatus comprising means for detecting a wireless charging of a mobile device by a wireless charger; and means for, upon detection of the wireless charging, triggering a wireless docking session between the mobile device and the wireless docking device.

Example 172 includes the subject matter of Example 171, and optionally, comprising means for detecting the wireless charging based on an indication from the wireless charger, and triggering the wireless docking session by triggering a wireless communication transceiver of the wireless docking device to establish the wireless docking session between the mobile device and the wireless docking device.

Example 173 includes the subject matter of Example 172, and optionally, comprising means for, when the wireless communication transceiver is at a power save mode, switching the wireless communication transceiver to an active mode, upon the detection of the wireless charging.

Example 174 includes the subject matter of any one of Examples 171-173, and optionally, comprising means for triggering the wireless charger to send to the mobile device a docking device identifier corresponding to the wireless docking device, and triggering a wireless communication transceiver of the wireless docking device to transmit to the mobile device one or more discovery messages comprising a value, which is based on the docking device identifier.

Example 175 includes the subject matter of Example 174, and optionally, comprising means for transmitting to the mobile device a first discovery message comprising a first hash value based on the docking device identifier and a first predefined string, processing a second discovery message from the mobile device comprising a second hash value based on the docking device identifier and a second predefined string, and associating with the mobile device based on the second hash value.

Example 176 includes the subject matter of Example 175, and optionally, wherein the first discovery message comprises a probe request, and the second discovery message comprises a probe response in response to the probe request.

Example 177 includes the subject matter of Example 175, and optionally, wherein the second discovery message comprises a probe request, and the first discovery message comprises a probe response in response to the probe request.

Example 178 includes the subject matter of any one of Examples 174-177, and optionally, wherein the docking device identifier comprises a Personal Identification Number (PIN).

Example 179 includes the subject matter of any one of Examples 174-178, and optionally, comprising means for triggering the wireless communication transceiver to establish a secure connection between the mobile device and the wireless docking device according to a Wi-Fi Protected Setup Personal Identification Number (WPS-PIN) protocol using the docking device identifier.

Example 180 includes the subject matter of any one of Examples 174-179, and optionally, comprising means for triggering the wireless charger to send the docking device identifier to the mobile device by modulating wireless power signals.

Example 181 includes the subject matter of any one of Examples 171-172, and optionally, comprising processing a mobile device identifier from the wireless charger, and triggering a wireless communication transceiver of the wireless docking device to transmit to the mobile device one or more discovery messages comprising a value, which is based on the mobile device identifier.

Example 182 includes the subject matter of Example 181, and optionally, comprising means for transmitting to the mobile device a first discovery message comprising a first hash value based on the mobile device identifier and a first predefined string, processing a second discovery message from the mobile device comprising a second hash value based on the mobile device identifier and a second predefined string, and associating with the mobile device based on the second hash value.

Example 183 includes the subject matter of Example 182, and optionally, wherein the first discovery message comprises a probe request, and the second discovery message comprises a probe response in response to the probe request.

Example 184 includes the subject matter of Example 182, and optionally, wherein the second discovery message comprises a probe request, and the first discovery message comprises a probe response in response to the probe request.

Example 185 includes the subject matter of any one of Examples 181-184, and optionally, wherein the mobile device identifier comprises a Personal Identification Number (PIN).

Example 186 includes the subject matter of any one of Examples 181-185, and optionally, comprising means for triggering the wireless communication transceiver to establish a secure connection between the mobile device and the wireless docking device according to a Wi-Fi Protected Setup Personal Identification Number (WPS-PIN) protocol using the mobile device identifier.

Example 187 includes the subject matter of any one of Examples 181-186, and optionally, comprising means for triggering the wireless charger to process receipt of the mobile device identifier from the mobile device.

Example 188 includes the subject matter of any one of Examples 171-187, and optionally, comprising means for, upon detection of the wireless charging, establishing a secure session between the mobile device and the wireless docking device based on one or more security keys of a previous secure session between the mobile device and the wireless docking device.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause a mobile device to:
   detect a wireless charging of said mobile device by a wireless docking device; and
   upon detection of the wireless charging, trigger a wireless docking session between the mobile device and the wireless docking device, wherein the apparatus is configured to trigger a wireless charging power receiver of said mobile device to send to the wireless docking device a mobile device identifier corresponding to said mobile device, and to trigger a wireless communication transceiver of said mobile device to transmit to the wireless docking device a first discovery message comprising a first hash value based on said mobile device identifier and a first predefined string, to process a second discovery message from the wireless docking device comprising a second hash value based on said mobile device identifier and a second predefined string, and to associate with the wireless docking device based on said second hash value.

2. The apparatus of claim 1 configured to cause the mobile device to detect said wireless charging based on an indication from the wireless charging power receiver of said mobile device, and to trigger the wireless docking session by triggering the wireless communication transceiver of said mobile device to establish the wireless docking session between the mobile device and the wireless docking device.

3. The apparatus of claim 1 configured to cause the mobile device to, when the wireless communication transceiver is at a power save mode, switch the wireless communication transceiver to an active mode, upon the detection of the wireless charging.

4. The apparatus of claim 1, wherein the first discovery message comprises a probe request, and the second discovery message comprises a probe response in response to the probe request.

5. The apparatus of claim 1, wherein the second discovery message comprises a probe request, and the first discovery message comprises a probe response in response to the probe request.

6. The apparatus of claim 1 configured to cause the mobile device to trigger the wireless communication transceiver to establish a secure connection between the mobile device and the wireless docking device according to a Wi-Fi Protected Setup Personal Identification Number (WPS-PIN) protocol using said mobile device identifier.

7. The apparatus of claim 1 configured to trigger the mobile device to, upon detection of the wireless charging, establish a secure session between the mobile device and the wireless docking device based on one or more security keys of a previous secure session between the mobile device and the wireless docking device.

8. The apparatus of claim 1 comprising the wireless charging power receiver to receive wireless power signals, and the wireless communication transceiver to establish the wireless docking session between the mobile device and the wireless docking device.

9. The apparatus of claim 1 comprising a memory, a processor, and one or more antennas.

10. An apparatus comprising circuitry and logic, configured to cause a mobile device to:
    detect a wireless charging of said mobile device by a wireless docking device; and
    upon detection of the wireless charging, trigger a wireless docking session between the mobile device and the wireless docking device, wherein the apparatus is configured to process a docking device identifier received by a wireless charging power receiver of the mobile device from the wireless docking device, and to trigger a wireless communication transceiver of the mobile device to transmit to the wireless docking device a first discovery message comprising a first hash value based on said docking device identifier and a first predefined string, to process a second discovery message from the wireless docking device comprising a second hash value based on said docking device identifier and a second predefined string, and to associate with the wireless docking device based on said second hash value.

11. The apparatus of claim 10 comprising a memory, a processor, and one or more antennas.

12. A product comprising one or more tangible computer-readable non-transitory storage media comprising computer-executable instructions operable to, when executed by at least one processor, enable the at least one processor to cause a mobile device to:
    detect a wireless charging of said mobile device by a wireless docking device; and
    upon detection of the wireless charging, trigger a wireless docking session between the mobile device and the wireless docking device, wherein the instructions, when executed, cause the mobile device to trigger a wireless charging power receiver of said mobile device to send to the wireless docking device a mobile device identifier corresponding to said mobile device to trigger a wireless communication transceiver of said mobile device to transmit to the wireless docking device a first discovery message comprising a first hash value based on said mobile device identifier and a first predefined string, to process a second discovery message from the wireless docking device comprising, a second hash value based on said mobile device identifier and a second predefined string, and to associate with the wireless docking device based on said second hash value.

13. The product of claim 12, wherein the instructions, when executed cause the mobile device to detect said wireless charging based on an indication from the wireless charging power receiver of said mobile device, and trigger the wireless docking session by triggering the wireless communication transceiver of said mobile device to establish the wireless docking session between the mobile device and the wireless docking device.

14. The product of claim 12, wherein the instructions, when executed cause the mobile device to, upon detection of the wireless charging, establish a secure session between the mobile device and the wireless docking device based on one or more security keys of a previous secure session between the mobile device and the wireless docking device.

* * * * *

UNITED STATES PATENT AND TRADEMARK OFFICE
CERTIFICATE OF CORRECTION

Page 1 of 1

PATENT NO. : 10,039,147 B2
APPLICATION NO. : 15/281119
DATED : July 31, 2018
INVENTOR(S) : Daniel Cohn et al.

It is certified that error appears in the above-identified patent and that said Letters Patent is hereby corrected as shown below:

In the Claims

In Column 46, Line 20, in Claim 10, delete "and logic, configured" and insert --and logic configured--, therefor.

In Column 46, Line 55, in Claim 12, delete "device to trigger" and insert --device, to trigger--, therefor.

In Column 46, Line 61, in Claim 12, delete "comprising, a second" and insert --comprising a second--, therefor.

Signed and Sealed this
Eighteenth Day of September, 2018

Andrei Iancu
*Director of the United States Patent and Trademark Office*